US008172152B2

(12) United States Patent
Thomson et al.

(10) Patent No.: US 8,172,152 B2
(45) Date of Patent: May 8, 2012

(54) METHOD FOR INKJET PRINTING OF E13B MAGNETIC INK CHARACTER RECOGNITION CHARACTERS AND SUBSTRATE HAVING SUCH CHARACTERS PRINTED THEREON

(75) Inventors: Christopher William Thomson, Etobicoke (CA); Robert Stuart McCallum, Caledon (CA); Victor Peter Foyle, Toronto (CA)

(73) Assignee: Delphax Technologies, Inc., Bloomington, MN (US)

( * ) Notice: Subject to any disclaimer, the term of this patent is extended or adjusted under 35 U.S.C. 154(b) by 503 days.

(21) Appl. No.: 12/408,231

(22) Filed: Mar. 20, 2009

(65) Prior Publication Data
US 2010/0238205 A1 Sep. 23, 2010

(51) Int. Cl.
*G06K 19/06* (2006.01)
(52) U.S. Cl. .................. 235/493; 235/449; 235/494
(58) Field of Classification Search .................. 235/493, 235/449, 494; 382/137, 139
See application file for complete search history.

(56) References Cited

U.S. PATENT DOCUMENTS

| | | | |
|---|---|---|---|
| 3,320,588 A | 5/1967 | Gallien | |
| 4,128,202 A | 12/1978 | Buros | |
| 4,381,494 A | 4/1983 | Wisner | |
| 5,026,904 A | 6/1991 | Lodge et al. | |
| 5,026,974 A * | 6/1991 | Franklin et al. | 235/449 |
| 5,257,319 A * | 10/1993 | Canu et al. | 382/139 |
| 5,341,193 A | 8/1994 | Hubble, III et al. | |
| 5,353,387 A | 10/1994 | Petschik et al. | |
| 5,367,578 A * | 11/1994 | Golem et al. | 382/183 |
| 5,382,963 A | 1/1995 | Pond et al. | |
| 5,524,063 A * | 6/1996 | Henrot | 382/139 |
| 5,706,414 A | 1/1998 | Pritchard | |
| 5,729,621 A * | 3/1998 | Marshall et al. | 382/139 |
| 5,789,727 A * | 8/1998 | Teradaira et al. | 235/449 |
| 6,582,056 B2 | 6/2003 | Alfaro | |
| 7,209,244 B2 | 4/2007 | Foster | |
| 7,255,433 B2 | 8/2007 | McElligott et al. | |
| 7,330,288 B2 | 2/2008 | Foster et al. | |
| 2005/0018896 A1 * | 1/2005 | Heit et al. | 382/137 |
| 2005/0134884 A1 | 6/2005 | Rombola et al. | |
| 2005/0285918 A1 | 12/2005 | McElligott et al. | |
| 2005/0286752 A1 | 12/2005 | Takiguchi | |

OTHER PUBLICATIONS

"Ecofont / Take a Look at the Ecofont"; http://www.ecofont.eu/look_at_ecofont_en.html; last visited Jun. 18, 2009. Accredited Standards Committee X9, Inc.; "American National Standard for Financial Services, ANS X9.100-20-2006, Print and Test Specifications for Magnetic Ink Printing (MICR)"; Jul. 13, 2006.
G7 Productivity Systems, Inc.; "VersaCheck 2010"; http://www.g7ps.com/scripts/printFactoryPro2010.asp; last visited Jun. 18, 2009.

* cited by examiner

*Primary Examiner* — Ahshik Kim
(74) *Attorney, Agent, or Firm* — Steven M. Greenberg, Esq.; Carey Rodriguez Greenberg & O'Keefe, LLP

(57) ABSTRACT

Electromagnetically recognizable E13B characters can be printed onto conventional paper by an inkjet printer using liquid magnetic ink. The printer receives data representing an E13B character, and prints the E13B character onto a substrate according to a modified E13B character pattern. The modified E13B pattern provides for an interior of the E13B character to be substantially completely filled, and includes one or more void arrangements arranged and positioned relative to a corresponding internal detection edge, and sized and shaped, to amplify the difference between the upstream magnetic signal detected on the upstream side of the internal detection edge and the downstream magnetic signal detected on the downstream side of the internal detection edge when an electromagnetic read head reads the resulting printed E13B character.

73 Claims, 20 Drawing Sheets

METHOD FOR INKJET PRINTING OF E13B MAGNETIC INK CHARACTER RECOGNITION CHARACTERS AND SUBSTRATE HAVING SUCH CHARACTERS PRINTED THEREON

FIELD OF INVENTION

The present invention relates to printing, and more particularly to printing of E13B magnetic ink character recognition (MICR) characters.

BACKGROUND OF THE INVENTION

In the financial industry, checks are commonly printed with MICR characters to facilitate automated processing of those checks. MICR characters are printed using magnetic ink or toner, that is, ink or toner that contains magnetic particles dispersed throughout, so that the characters can be read automatically by a data processing system that includes a suitable electromagnetic read head. One widely used standard for such characters is the E13B standard, which defines with specificity the patterns and relative dimensions of the numerical characters 1, 2, 3, 4, 5, 6, 7, 8, 9 and 0, as well as a number of special characters. The E13B patterns for the numerical characters 1, 2, 3, 4, 5, 6, 7, 8, 9 and 0 are shown in FIG. 1. The ANSI (American National Standards Institute) standard for the E13B character set is ANS X9.100.20.2006 (American National Standard for Financial Services) published by the Accredited Standards Committee X9, Incorporated. This standard is also replicated in other national standards in other countries that use the E13B font, such as the Canadian Payments Association Standard 006 entitled "Standards and Specifications for MICR Encoded Documents". ANS X9.100.20.2006 is hereby incorporated by reference in its entirety.

With the E13B standard, the characters are automatically read by sensing the vertical shape transitions or "edges" ("vertical" in the sense of being perpendicular to the read direction) of the specially designed standard characters as the characters pass over an electromagnetic read head (or as the read head is passed over the characters). It is the nature of the electromagnetic sensing that it requires high precision in the shape and dimensions of the characters. As the read head passes over the characters (or vice versa), it produces a waveform which has peaks that correspond to the vertical edges of the characters, and the pattern of the peaks enables the character to be recognized. Such vertical edges are referred to herein as "detection edges", since these edges produce the peaks in the waveform used to indentify the characters.

One of the parameters that determines the amplitude of a peak is the magnetic acuity of a detection edge. The magnetic acuity of a vertical edge is affected by the roughness of the detection edge. A rough detection edge reduces the acuity and therefore reduces the amplitude of the peak, which can make the character unrecognizable to the automated detection system. Limits on the roughness of a detection edge are prescribed in ANS X9.100.20.2006. The distance of the ink from the read head also affects the magnetic acuity; if the magnetic ink is further from the electromagnetic read head, the amplitude of the peak is reduced by the increased distance (which reduces the strength of the magnetic signal).

For E13B MICR characters printed using offset printing, impact printing or electrostatographic printing, the magnetic acuity of the detection edges is relatively independent of the absorbency of the paper that the character is printed on, since the magnetic ink is on or close to the surface of the paper. Moreover, with these printing methods, the roughness of the detection edges is not greatly affected by inward transportation of the magnetic ink due to the absorption of the ink or toner by the paper. Printing of checks is typically done using offset printing, impact printing or electrostatographic printing.

It is also desirable to be able to print checks using inkjet printing. In inkjet printing, tiny droplets of liquid ink are expelled from a print head having a large number of individual nozzles to create a desired pattern on the substrate. One type of liquid ink used in inkjet printing is curable ink, which, following deposition on the substrate, hardens into a solid in response to an environmental factor, such as ultraviolet radiation. Another type of liquid ink used in inkjet printing is aqueous ink, which, after deposition on the substrate, becomes solid as a result of evaporation of the aqueous carrier and absorption of the aqueous carrier into the substrate. Since inkjet printers are commonly used in private homes as part of a home computer system, inkjet printing of checks enables individuals to print their own custom checks at home, providing potential cost savings. For example, G7 Productivity Systems, having an address at P.O. Box 270459, San Diego, Calif. 92198 (www:g7ps.com), has offered a cheque printing kit under the brand VersaCheck®, which includes a Versajette M300 printer (a re-badged Lexmark Z1300 printer), cheque paper, software and a cartridge containing Versaink nano™ aqueous MICR ink. In order to be processed automatically by a financial institution using the E13B standard, such checks would need to include readable E13B MICR characters.

However, for E13B MICR characters printed using inkjet printing, the magnetic acuity of the detection edges can be affected by the absorbency of the paper that the character is printed on. Because of the requirements of the inkjet process, such as avoidance of clogging of the very small passageways often used in inkjet printing, the viscosity of the liquid ink is relatively low and the magnetic material is composed of very small particles. As a result, depending on the type of paper used, the ink may be readily absorbed and the magnetic ink transported from the surface of the paper and into the body of the paper. This increases the roughness (i.e. reduces the sharpness) of the detection edges, as well as increasing the distance between the magnetic ink and the read head.

The above-noted problems with inkjet printing of E13B MICR characters can reduce the amplitude of the peak associated with a detection edge, which can thereby make it more difficult to recognize E13B MICR characters printed using an inkjet process. Where the automated character recognition systems cannot identify a character, then the document must be redirected for costly manual processing.

One technique that has been used in an effort to obviate these difficulties is to print on special papers which contain materials on the surface of the paper or in the body of the paper designed to control the absorbency of the paper and/or the transportation of the ink along the surface of the paper. However, such special types of papers are usually more expensive, and may have a different "look and feel", than the papers on which E13B MICR characters are normally or preferably printed. Moreover, such special papers may be unsuitable for automatic processing. Thus, in many cases the use of a specialized paper to enable inkjet printing of readable E13B MICR characters may be expensive, infeasible and/or undesirable.

SUMMARY OF THE INVENTION

In one aspect, the present invention is directed to a substrate having printed thereon in magnetic ink at least one electromagnetically recognizable E13B character selected from the group consisting of "1", "3", "8" and "9". Each such E13B character has an interior that is substantially completely inked and has a shape that defines a plurality of internal detection edges. The interior of each such E13B character includes at least one elongate, narrow region of reduced ink density immediately adjacent at least one respective internal detection edge to augment that at least one detection edge.

In one embodiment, the interior of one of the at least one E13B character includes an elongate, narrow region of reduced ink density immediately adjacent and downstream, relative to a read direction, of a detection edge defined by a transition from some magnetic ink to less magnetic ink. In another embodiment, the interior of one of the at least one E13B character includes an elongate, narrow region of reduced ink density immediately adjacent and upstream, relative to a read direction, of a detection edge defined by a transition from some magnetic ink to more magnetic ink. Preferably, each E13B character is compliant with ANS X9.100-20-2006.

In one particular embodiment, the at least one E13B character comprises at least one "1", and the interior of each "1" includes at least one elongate, narrow region of reduced ink density immediately adjacent and downstream of, relative to a read direction, a last internal detection edge defined by a transition from some magnetic ink to less magnetic ink. In a more particular embodiment, each "1" comprises a leading base portion, a stem portion, a serif portion and a trailing base portion. The last internal detection edge defined by a transition from some magnetic ink to less magnetic ink is defined by a transition between the stem portion and the serif and trailing base portions, and the at least one elongate, narrow region of reduced ink density comprises a first elongate, narrow region of reduced ink density disposed substantially within the trailing base portion and a second elongate, narrow region of reduced ink density disposed substantially within the serif portion.

In another particular embodiment, the at least one E13B character comprises at least one "3", and the interior of each "3" includes an elongate, narrow region of reduced ink density immediately adjacent and upstream of, relative to a read direction, a first internal detection edge defined by a transition from some magnetic ink to more magnetic ink. In a more particular embodiment, each "3" comprises a lower leading portion, a stem portion, and three horizontally extending members. The first internal detection edge defined by a transition from some magnetic ink to more magnetic ink is defined between the lower leading portion and the stem portion, and an elongate, narrow region of reduced ink density is disposed substantially within the lower leading portion.

In still another particular embodiment, the at least one E13B character comprises at least one "8", and the interior of each "8" includes two elongate, narrow regions of reduced ink density. A first elongate, narrow region of reduced ink density is immediately adjacent and upstream of, relative to a read direction, a first internal detection edge defined by a transition from some magnetic ink to more magnetic ink, and a second elongate, narrow region of reduced ink density is immediately adjacent and downstream of, relative to the read direction, a last internal detection edge defined by a transition from some magnetic ink to less magnetic ink. In a particular embodiment, each "8" comprises a lower leading portion, a first stem portion, three horizontally extending members, a second stem portion, and a lower trailing portion. In this more particular embodiment, the first internal detection edge defined by a transition from some magnetic ink to more magnetic ink is defined between the lower leading portion and the first stem portion, and the first elongate, narrow region of reduced ink density is disposed substantially within the lower leading portion, and the last internal detection edge defined by a transition from some magnetic ink to less magnetic ink is defined between the second stem portion and the lower trailing portion, and the second elongate, narrow region of reduced ink density is disposed substantially within the lower trailing portion.

In yet another particular embodiment, the at least one E13B character comprises at least one "9", and the interior of each "9" includes an elongate, narrow region of reduced ink density immediately adjacent and downstream of, relative to a read direction, a first internal detection edge defined by a transition from some magnetic ink to less magnetic ink. In a more particular embodiment, each "9" comprises a leading stem portion, a lower stem continuation portion, an upper stem continuation portion, two horizontally extending members and a vertical loop completion portion. The first internal detection edge defined by a transition from some magnetic ink to less magnetic ink is defined between the leading stem portion and the lower and upper stem continuation portions, and an elongate, narrow region of reduced ink density is disposed substantially within the lower stem continuation portion.

In another aspect, the present invention is directed to a method for inkjet printing an electromagnetically recognizable E13B character onto a substrate using liquid magnetic ink. The method comprises receiving data representing a character to be printed for electromagnetic recognition, with the character selected from the group consisting of "1", "3", "8" and "9", and loading an E13B character pattern corresponding to the received data. The E13B character pattern is substantially completely filled, defines a plurality of internal detection edges for a corresponding E13B character, and defines at least one substantially linear void arrangement immediately adjacent and parallel to at least one of the internal detection edges. The method further comprises printing the corresponding E13B character onto the substrate in liquid magnetic ink according to the E13B character pattern. The printing of the corresponding E13B character produces an E13B character that is electromagnetically recognizable and includes at least one elongate, narrow region of reduced ink density corresponding to the at least one substantially linear void arrangement to augment the respective at least one internal detection edge. Optionally, the printing step may further comprise substantially filling each void arrangement by ink feathering to produce the at least one region of reduced ink density.

In one embodiment, the step of loading the E13B character pattern corresponding to the received data comprises loading an E13B character pattern which has at least one substantially linear void arrangement comprising at least one plurality of voids arranged in a narrow, elongate, substantially linear formation.

In another embodiment, the step of loading the E13B character pattern corresponding to the received data comprises loading an E13B character pattern which has at least one substantially linear void arrangement comprising at least one narrow, elongate individual void.

The step of loading the E13B character pattern corresponding to the received data may comprise loading an E13B character pattern having at least one substantially linear void arrangement located downstream, relative to a read direction, of a detection edge defined by a transition from some fill to less fill, measured perpendicular to the read direction. The step of loading the E13B character pattern corresponding to the received data may comprise loading an E13B character pattern having at least one substantially linear void arrangement located upstream, relative to a read direction, of a detection edge defined by a transition from some fill to more fill, measured perpendicular to the read direction.

The step of loading the E13B character pattern corresponding to the received data may comprise loading an E13B character pattern having at least one substantially linear void arrangement comprising a rectangular void having long sides and short sides, in which each rectangular void is arranged so that its long sides are parallel to the respective at least one internal detection edge.

The step of loading the E13B character pattern corresponding to the received data may comprise loading a 600 dpi bitmap E13B character pattern in which each substantially linear void arrangement comprises a plurality of individual rectangular voids, and in which each rectangular void comprises a three bit by one bit rectangle, and in which each rectangle in each substantially linear void arrangement is vertically separated by one filled bit.

In one embodiment, the printing step comprises printing a corresponding E13B character that is compliant with ANS X9.100-20-2006.

In one embodiment of the method, the character is a "1", and the step of loading the E13B character pattern corresponding to the received data comprises loading an E13B character pattern for the "1" which includes at least one substantially linear void arrangement that is substantially parallel to, immediately adjacent, and downstream of, relative to a read direction, a last internal detection edge defined by a transition from some fill to less fill, measured perpendicular to the read direction. In a particular embodiment, the step of loading the E13B character pattern corresponding to the received data further comprises loading an E13B character pattern for the "1" which comprises a leading base portion, a stem portion, a serif portion and a trailing base portion, in which the last internal detection edge defined by a transition from some fill to less fill is defined by a transition between the stem portion and the serif and trailing base portions, and which includes a first substantially linear void arrangement within the trailing base portion and a second substantially linear void arrangement within the serif portion.

In another embodiment of the method, the character is a "3", and the step of loading the E13B character pattern corresponding to the received data comprises loading an E13B character pattern for the "3" which includes a substantially linear void arrangement that is substantially parallel to, immediately adjacent, and upstream of, relative to a read direction, a first internal detection edge defined by a transition from some fill to more fill, measured perpendicular to the read direction. In a particular embodiment, the step of loading the E13B character pattern corresponding to the received data further comprises loading an E13B character pattern for the "3" comprising a lower leading portion, a stem portion, and three horizontally extending members, in which the first internal detection edge defined by a transition from some fill to more fill is defined between the lower leading portion and the stem portion, and which includes a substantially linear void arrangement within the lower leading portion.

In a further embodiment of the method, the character is an "8", and the step of loading the E13B character pattern corresponding to the received data comprises loading an E13B character pattern for the "8" which includes a first substantially linear void arrangement that is substantially parallel to, immediately adjacent and upstream of, relative to a read direction, a first internal detection edge defined by a transition from some fill to more fill, measured perpendicular to the read direction, and a second substantially linear void arrangement that is substantially parallel to, immediately adjacent and downstream of, relative to the read direction, a last internal detection edge defined by a transition from some fill to less fill, measured perpendicular to the read direction. In a particular embodiment, the step of loading the E13B character pattern corresponding to the received data further comprises loading an E13B character pattern for the "8" comprising a lower leading portion, a first stem portion, three horizontally extending members, a second stem portion, and a lower trailing portion. In the E13B character pattern for the "8", the first internal detection edge defined by a transition from some fill to more fill is defined between the lower leading portion and the first stem portion, and the first substantially linear void arrangement is within the lower leading portion, and the last internal detection edge defined by a transition from some fill to less fill is defined between the second stem portion and the lower trailing portion, and the second substantially linear void arrangement is within the lower trailing portion.

In yet a further embodiment of the method, the character is a "9", and the step of loading the E13B character pattern corresponding to the received data comprises loading an E13B character pattern for the "9" which includes a substantially linear void arrangement that is substantially parallel to, immediately adjacent, and downstream of, relative to a read direction, a first internal detection edge defined by a transition from some fill to less fill, measured perpendicular to the read direction. In a particular embodiment, the step of loading the E13B character pattern corresponding to the received data further comprises loading an E13B character pattern for the "9" comprising a leading stem portion, a lower stem continuation portion, an upper stem continuation portion, two horizontally extending members and a vertical loop completion portion, in which the first internal detection edge defined by a transition from some fill to less fill is defined between the leading stem portion and the lower and upper stem continuation portions, and in which a substantially linear void arrangement is disposed within the lower stem continuation portion.

In another aspect, the present invention is directed to a method for inkjet printing an electromagnetically recognizable numerical E13B character onto a substrate using liquid magnetic ink. The method comprises the steps of receiving data representing a character to be printed for electromagnetic recognition, and loading an E13B character pattern corresponding to the received data. The E13B character pattern is substantially completely filled, defines a plurality of internal detection edges for a corresponding E13B character, and defines at least one void arrangement that is sized and shaped, and arranged and positioned relative to a corresponding internal detection edge, to amplify a difference between an upstream magnetic signal on an upstream side of the corresponding internal detection edge and a downstream magnetic signal detected on a downstream side of the corresponding internal detection edge. The method further comprises printing an electromagnetically recognizable corresponding E13B character onto the substrate in liquid magnetic ink according to the E13B character pattern to produce a corresponding E13B character having at least one region of reduced ink density corresponding to the at least one void arrangement.

In one embodiment, the character may be selected from the group consisting of "1", "3", "8" and "9". The printing step may comprise printing each corresponding E13B character to be compliant with ANS X9.100-20-2006.

In still another aspect, the present invention is directed to a substrate having printed thereon in magnetic ink at least one electromagnetically recognizable numerical E13B character.

Each such E13B character has an interior that is substantially completely inked and has a shape that defines a plurality of internal detection edges. The interior of each such E13B character includes at least one region of reduced ink density arranged and positioned relative to at least one corresponding internal detection edge to amplify a difference between an upstream magnetic signal detected on an upstream side of the corresponding internal detection edge and a downstream magnetic signal detected on a downstream side of the corresponding internal detection edge when an electromagnetic read head reads the at least one printed E13B character. In a particular embodiment, the character is selected from the group consisting of "1", "3", "8" and "9". Preferably, each E13B character is compliant with ANS X9.100-20-2006.

In other aspects, the present invention is directed to computer program products and to computer systems for implementing the above-described methods and for producing the above-described substrates.

BRIEF DESCRIPTION OF THE DRAWINGS

These and other features of the invention will become more apparent from the following description in which reference is made to the appended drawings wherein.

DETAILED DESCRIPTION

As indicated above, the automatic reading apparatus used to read E13B MICR characters relies on the position and amplitude of the peaks of the waveform generated by passing the read head over the E13B MICR characters to identify those characters. More particularly, each E13B MICR character should produce a waveform having a known pattern, and industry standards have been established for the position and amplitude of the peaks for each E13B character. As such, if the position or amplitude of a peak is not within the limits stated by the E13B standard, the character cannot be reliably identified.

As noted above, a particular peak is caused by a detection edge. A detection edge is a vertical (i.e. perpendicular to the read direction) edge representing a transition, in the read direction, from (a) no magnetic ink to some magnetic ink; (b) some magnetic ink to no magnetic ink; (c) some magnetic ink to more magnetic ink; or (d) some magnetic ink to less magnetic ink. It has been determined empirically by the inventors that it is this latter transition, from some magnetic ink to less magnetic ink, that is most problematic when E13B MICR characters are printed using an inkjet technique. The transition from some magnetic ink to more magnetic ink may also be problematic.

The magnetic acuity of a detection edge is affected by the rate of change of the areal density of the magnetic ink at the detection edge. If the change in the areal density of the magnetic ink at the edge is gradual, the amplitude of the peak (and hence the magnetic acuity of the detection edge) will be reduced. It has been found that inkjet printing reduces the rate of change of the areal density of the magnetic ink at the detection edge, because of absorption of the ink, and hence the magnetic material contained therein, into the paper.

Figure 1A:
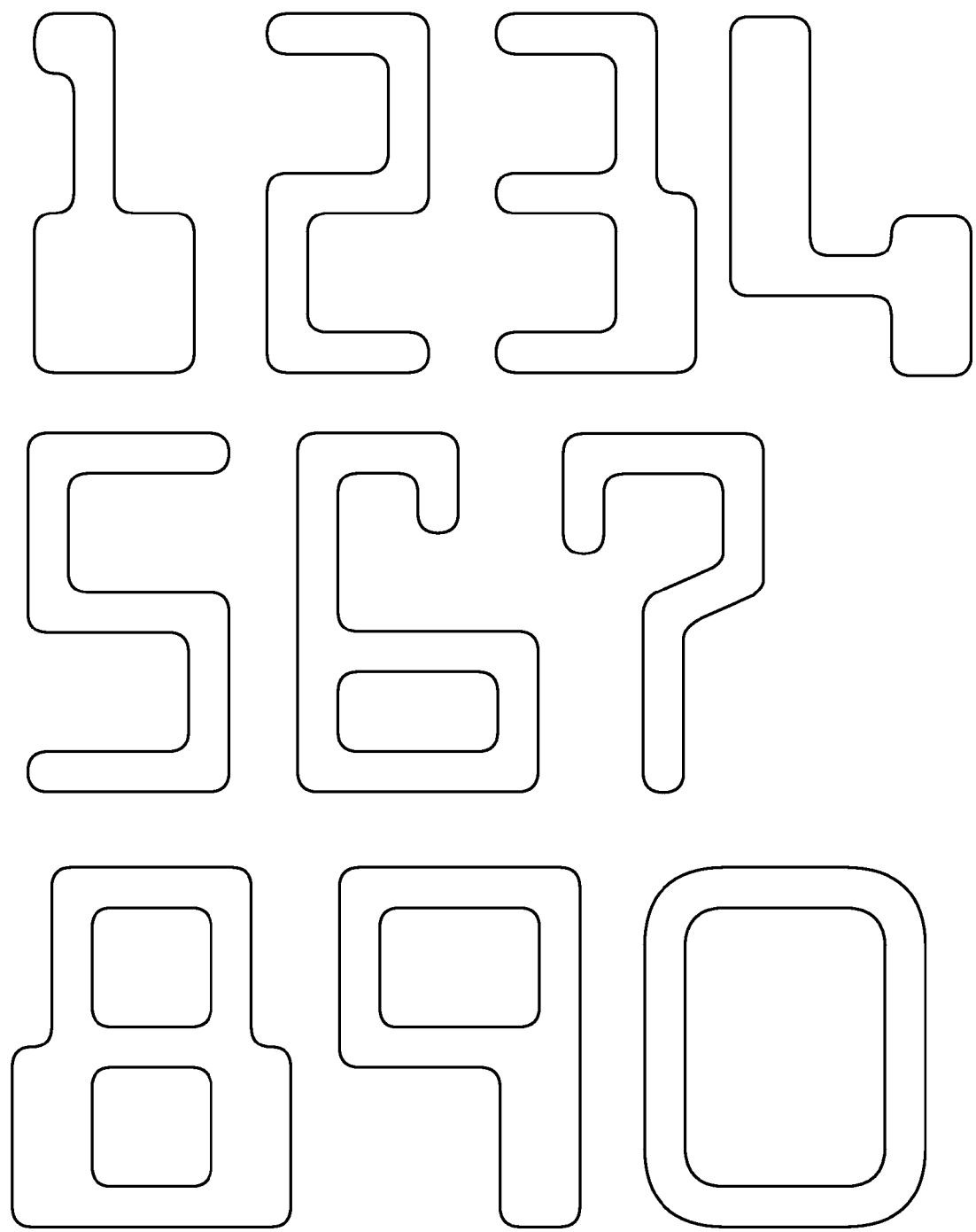
FIG. 1A shows the numbers 0 to 9 as represented in the E13B character set.
Figure 1B:
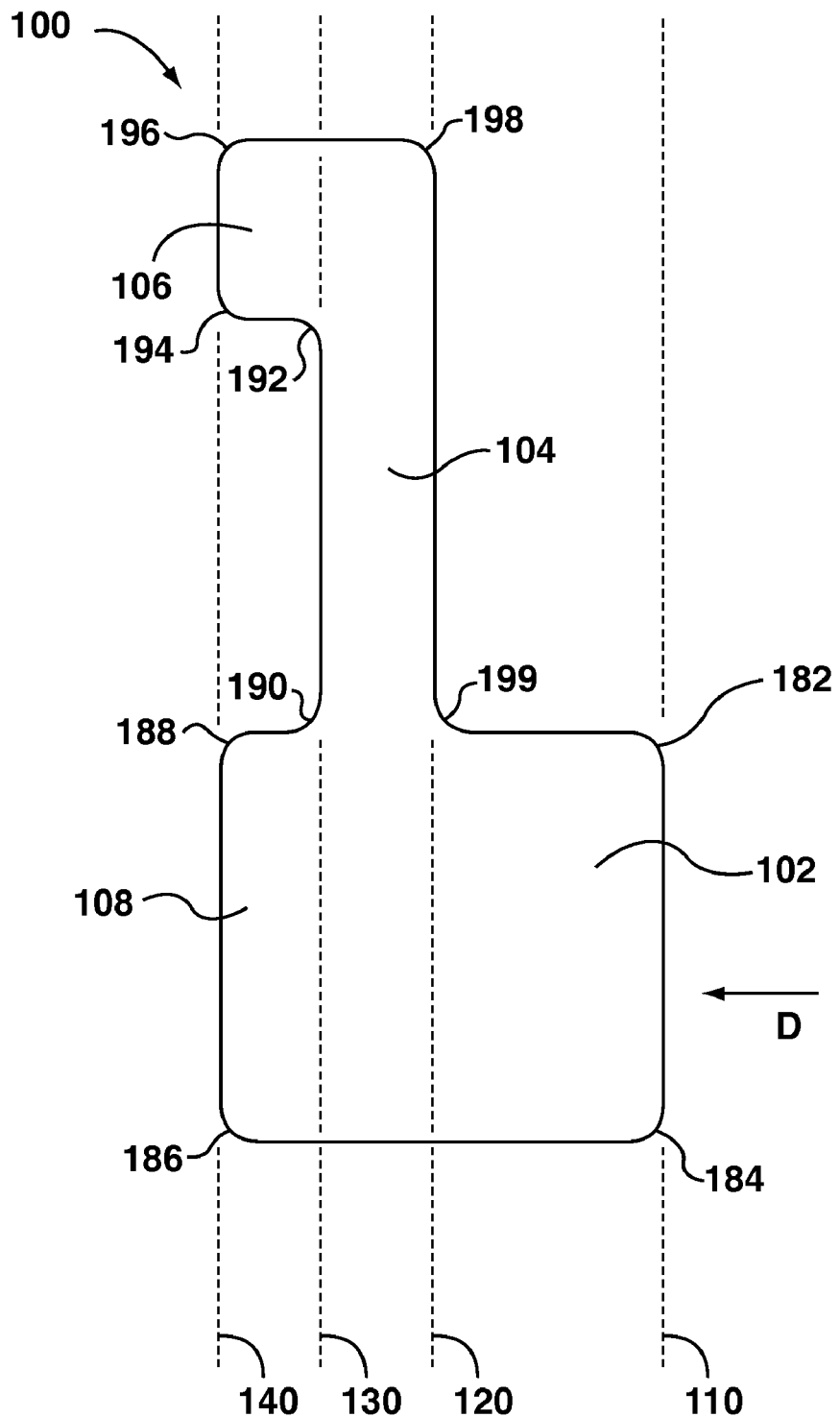
FIG. 1B shows a detailed view of a conventional "1" character in the E13B character set.

FIG. 1A shows the conventional character patterns for the numbers 0 to 9 in the E13B character set. In FIG. 1B the conventional character pattern for the number "1" in the E13B character set is denoted generally by reference numeral 100. Such a character pattern may be, for example, a bitmap pattern. E13B characters, such as that represented by the "1" character pattern 100 in FIG. 1B, have a read direction "D" in which they are to be processed by an automatic reader, and the detection edges are perpendicular to the read direction D. By convention, this read direction D is from right to left. The "1" character pattern 100 comprises, moving in the read direction, a leading base portion 102, a stem portion 104, a serif portion 106 and a trailing base portion 108. The interior of the "1" character pattern 100 is filled, and the shape of the "1" character pattern 100 defines four detection edges 110, 120, 130, 140 each of which denotes a transition. More particularly, the detection edge 110 represents a transition from no fill to some fill (the leading base portion 102) which, when the "1" is printed, will be a transition from no magnetic ink to some magnetic ink. Similarly, the detection edge 120 represents a transition from some fill (the leading base portion 102) to more fill (the stem portion 104), corresponding to a transition from some magnetic ink to more magnetic ink upon printing, the detection edge 130 represents a transition from some fill (the stem portion 104) to less fill (the serif portion 106 and trailing base portion 108), which upon printing will be a transition from some magnetic ink to less magnetic ink, and the detection edge 140 represents a transition from some fill (the serif portion 106 and trailing base portion 108) to no fill, which will become a transition from some magnetic ink to no magnetic ink when the character is printed according to the "1" character pattern 100. It will be appreciated that the transitions are measured in a direction perpendicular to the read direction D. Using the detection edge 120 as an illustrative example, it can be seen that on the downstream side of the detection edge 120, namely the stem portion 104, the "1" pattern 100 is entirely filled along the detection edge 120, which is perpendicular to the read direction D, while on the upstream side of the detection edge 120, namely the leading base portion 102, the "1" pattern 100 is only partially filled along the detection edge 120; hence, the detection edge 120 represents a transition from some fill to more fill.

Detection edges which are defined by an outer boundary of an E13B character, such as the detection edges 110 and 140, are referred to herein as "boundary detection edges". Boundary detection edges represent a transition from no fill to some fill, such as the detection edge 110, or a transition from some fill to no fill, such as the detection edge 140. Detection edges which extend through the body of an E13B character, such as detection edges 120 and 130, are referred to herein as "internal detection edges". Internal detection edges represent a transition from some fill to more fill, such as the detection edge 120, or a transition from some fill to less fill, such as the detection edge 130.

Figure 2:
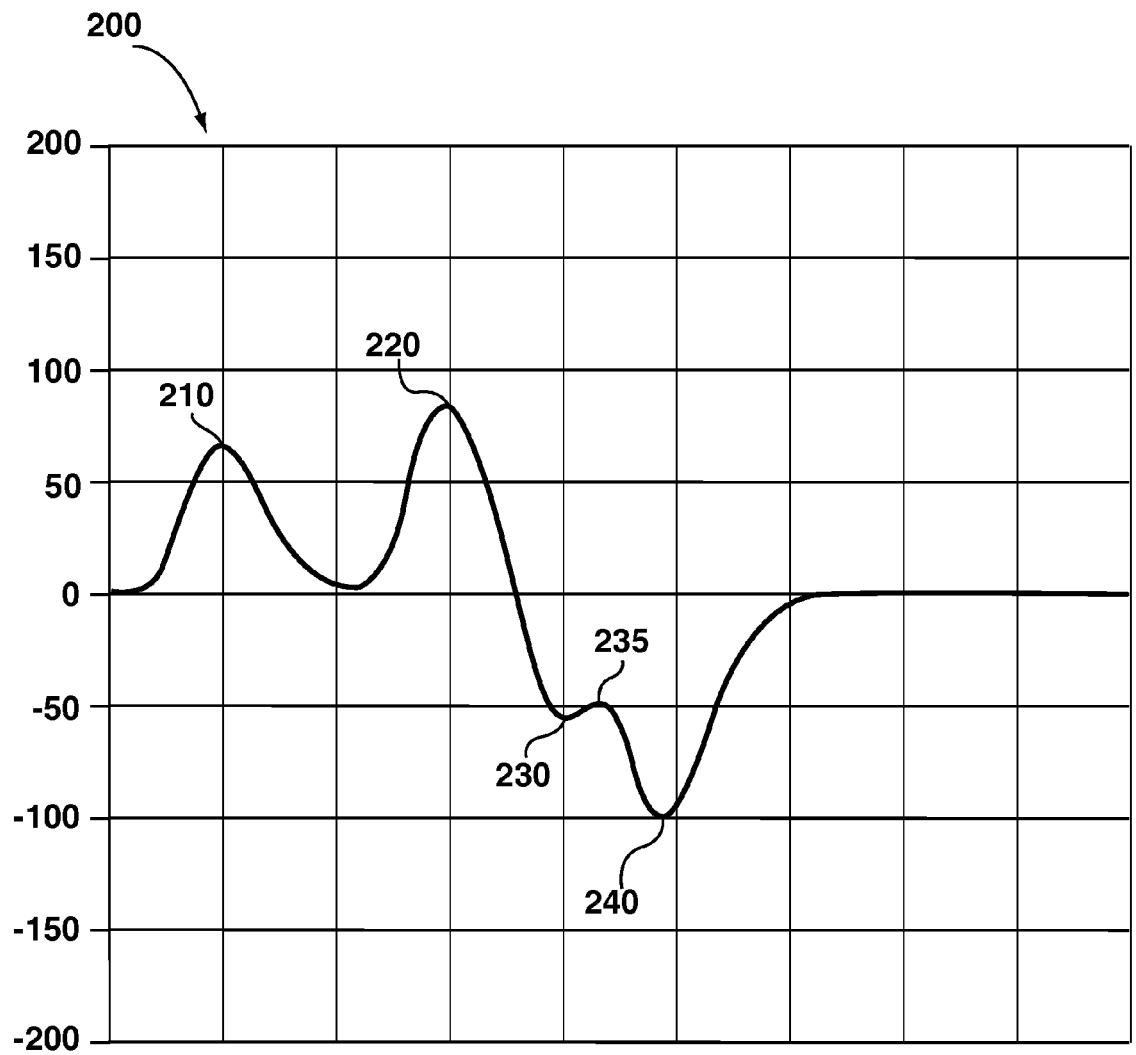
FIG. 2 shows a standard waveform for an E13B "1" character.

With reference now to FIG. 2, the industry standard waveform for the number "1" in the E13B character set, as set out in ANS X9.100.20.2006, is shown generally at 200. In other words, when a data processing system coupled to a read head receives from the read head a signal representative of a waveform that is sufficiently similar to the waveform 200, that signal will be interpreted as the number "1". More particularly, the peak 210 corresponds to the detection edge 110, the peak 220 corresponds to the detection edge 120, the peak 230 corresponds to the detection edge 130, and the peak 240 corresponds to the detection edge 140. Reference numeral 235 denotes the transition between the magnetic signal corresponding to the detection edge 130, culminating in the peak 230, and the magnetic signal corresponding to the detection edge 140, culminating in the peak 240. A data processing system used to detect MICR characters will accept certain slight variations in the location and magnitude of the peaks of a detected waveform, relative to the location and magnitude of the peaks 210, 220, 230 and 240 in the standard waveform 200. However, in order to avoid erroneous identifications, such variations must be small, and the associated tolerances are therefore limited. Where a variation exceeds those tolerances, the MICR character will not be recognized as the number "1" at all, and the document on which the character is printed would be diverted for manual processing. The exact tolerances are determined by the particular MICR reader used and/or by user-specified settings, and there is a trade-off in that lower tolerances will increase the number of unrecognized characters and hence the number of documents redirected for manual processing, while higher tolerances will increase the potential for characters to be incorrectly identified, which is highly undesirable in the context of financial instruments.

Figure 3:
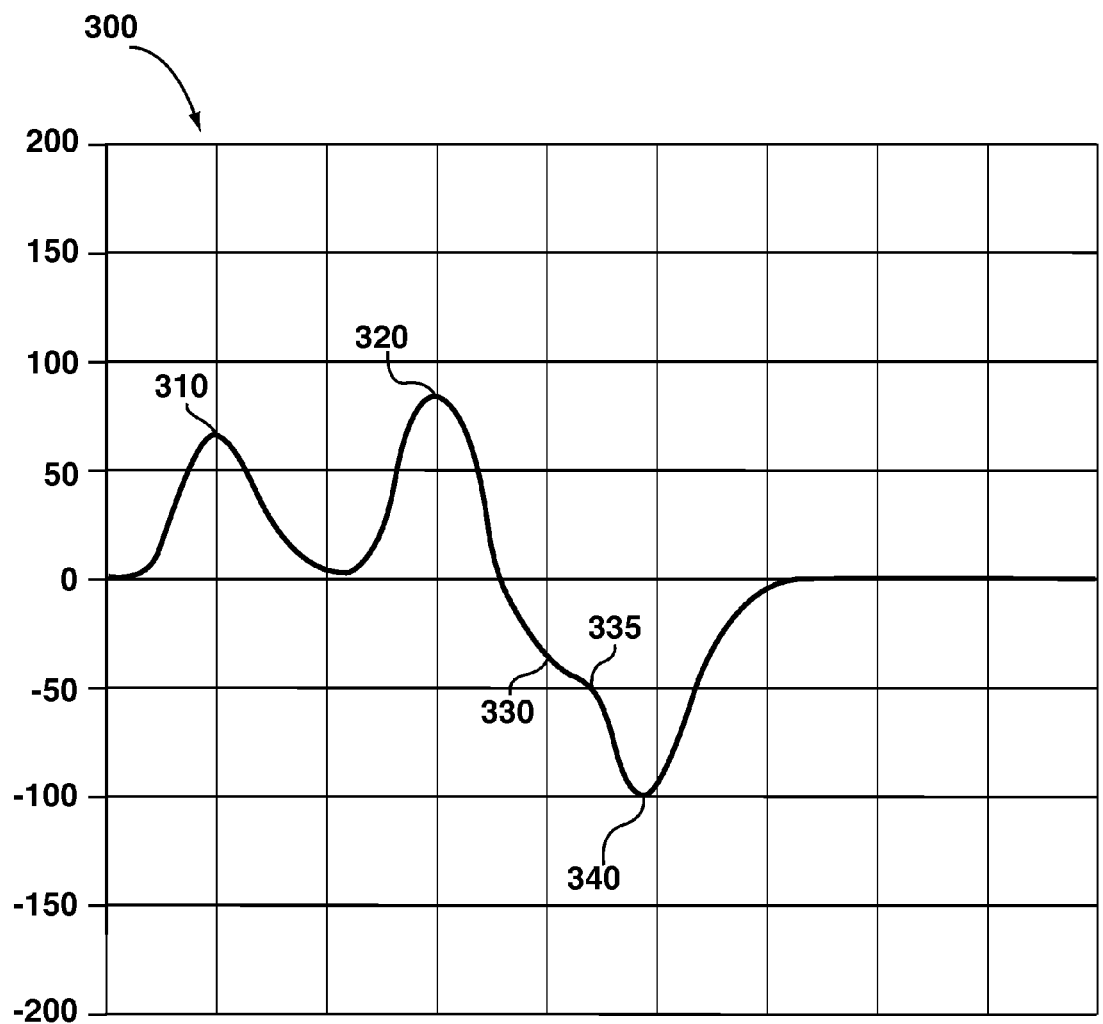
FIG. 3 shows a waveform which may result from electromagnetic scanning of a conventional E13B "1" character conventionally inkjet printed onto ordinary paper.

If the conventional prior art pattern for the E13B character "1" 100 were to be printed with liquid magnetic ink (i.e. ink containing magnetic particles) on conventional paper using an inkjet process, absorption of the ink by the paper would generally result in a number of adverse effects. (One example of such conventional paper is the multipurpose recycled 20 lb bond paper offered, under part numbers 3R6296 and 3R6298, by Xerox Corporation, having an address at 45 Glover Avenue, P.O. Box 4505, Norwalk, Conn., U.S.A. 06856-4505. It should be noted here that this type of paper would be unsuitable for printing checks, since it would not survive processing through the automated readers; check stock paper is stronger and is designed to withstand these stresses although it would still generally result in absorption of liquid magnetic ink and the associated adverse effects.) The visual appearance of the character on the paper may be affected, and the areal density of the magnetic ink within the perimeter of the character will be modified as some of the ink is absorbed into the paper. As a result of these effects, when a conventional E13B MICR "1" character is printed onto conventional paper with liquid magnetic ink by conventional inkjet printing, the resulting printed "1" may, when scanned by an electromagnetic read head, produce a waveform 300 similar to that shown in FIG. 3.

The waveform 300, similar to the standard waveform 200 shown in FIG. 2, has four peaks 310, 320, 330 and 340 which correspond generally to the peaks 210, 220, 230 and 240 in the standard waveform 200 (FIG. 2). The "peak" 330 corresponds to detection edge 130 (FIG. 1A), which represents a transition from some magnetic ink to less magnetic ink. It can be seen that in the waveform 300 (resulting from scanning an E13B MICR character "1" 100 (FIG. 1B) that was conventionally inkjet printed with magnetic ink onto non-specialized paper), the absolute amplitude of this "peak" 330, measured relative to absolute y-value at the transition 335 between the magnetic signal corresponding to the detection edge 130 and the magnetic signal corresponding to the detection edge 140, is substantially less than the absolute amplitude of the corresponding peak 230 in the standard waveform 200 (FIG. 2), to the extent that characterizing it as a "peak" is a matter of descriptive consistency only. As a result of this difference in amplitude, the waveform 300 would generally not be recognized by the data processing system as the number "1". Without being limited by theory, it is believed that the reduced amplitude of the "peak" 330 results from inward migration of the magnetic ink into the paper and diffusion laterally to produce a magnetic gradient across the detection edge 130, when the change in the magnetic signal across the detection edge 130 should be abrupt.

According to an aspect of the present invention, the patterns for certain E13B characters are modified to provide increased magnetic acuity at certain internal detection edges. Because the read heads used in electromagnetic reading of E13B characters detect changes in magnetic signals, rather than absolute magnetic signals, the patterns are modified to result in an increase in the difference between the magnetic signals on either side of an internal detection edge. Thus, according to an aspect of the present invention, an E13B character may be printed onto a substrate according to a character pattern which defines a plurality of internal detection edges, and which pattern includes at least one void arrangement. Each of the voids in the void arrangement is sized and shaped, and the void arrangement is arranged and positioned, relative to a corresponding internal detection edge, to amplify the difference between an upstream magnetic signal detected on an upstream side of the internal detection edge and a downstream magnetic signal detected on a downstream side of the internal detection edge when an electromagnetic read head reads the resulting printed E13B character. The word "amplify" and related words, when used in respect of the difference between an upstream magnetic signal detected on an upstream side of the internal detection edge and a downstream magnetic signal on a downstream side of the internal detection edge, refer to an increase relative to the signal that would be expected if the relevant void arrangements were not included in the E13B character pattern, and the character pattern were completely filled. Thus, the difference is relative to the magnetic signal that would be expected from an otherwise identical E13B character (i.e. the same size, exterior shape, etc.) printed on the same substrate with the same type of liquid magnetic ink, but according to a character pattern whose interior is completely filled.

Accordingly, an inkjet printer can be provided with a reservoir containing magnetic ink, receive data representing an E13B character to be printed for electromagnetic recognition, and then an electromagnetically recognizable E13B character can be inkjet printed using liquid magnetic ink, by using the relevant modified character pattern. The data received by the printer may contain an E13B character pattern already modified according to an aspect of the present invention, or may provide a signal to the printer that a particular character is to be printed as an E13B character, in which case the modified E13B character pattern, or instructions for so modifying a standard E13B character, may be stored on the printer or stored elsewhere and retrieved by the printer. Upon receiving the data, the printer can then print the E13B character onto a substrate according to the relevant E13B character pattern Accordingly, with reference now to FIG. 17, an exemplary method for inkjet printing an electromagnetically recognizable E13B character onto a substrate using liquid magnetic ink according to an aspect of the present invention is shown generally at 1700. At step 1702, an inkjet printer receives data representing a character to be printed for electromagnetic recognition. At step 1704, the inkjet printer loads an E13B character pattern corresponding to the received data. The E13B character pattern is substantially completely filled, defines a plurality of internal detection edges for a corresponding E13B character, and defines at least one void arrangement as described elsewhere herein. For example, and without limitation, the E13B character pattern may be any of the exemplary E13B "1", "3", "5" and "7" E13B character patterns described herein in the context of FIGS. 4, 5 and 7 to 16. Thus, the void arrangement in the E13B character pattern loaded at step 1704 is sized and shaped, and is arranged and positioned relative to a corresponding internal detection edge, to amplify a difference between an upstream magnetic signal on an upstream side of the corresponding internal detection edge and a downstream magnetic signal detected on a downstream side of the corresponding internal detection edge. Typically, the void arrangement is a substantially linear void arrangement, and is immediately adjacent and parallel to at least one of the internal detection edges. At step 1706, the inkjet printer prints the corresponding E13B character onto the substrate in liquid magnetic ink according to the E13B character pattern. As a result of such printing, the substrate will have printed thereon an electromagnetically recognizable corresponding E13B character having at least one region of reduced ink density corresponding to the at least one void arrangement. Typically, the at least one region of reduced ink density in the resulting printed E13B character will be an elongate, narrow region adjacent an internal detection edge to augment that detection edge.

Optionally, the printing step 1706 may further comprise substantially filling each void arrangement by ink feathering, following deposition of the ink onto the substrate, to produce the at least one region of reduced ink density.

The method 1700 can be repeated for as many E13B characters as are to be printed onto the substrate.

The result of inkjet printing according to this method will be a substrate having printed thereon in magnetic ink at least one electromagnetically recognizable E13B character. Each such character will have an interior that is substantially completely inked, and the shape of the character will define a plurality of internal detection edges. The interior of each such character will include at least one region of reduced ink density arranged and positioned relative to a corresponding internal detection edge so as to result in an increase in the difference between an upstream magnetic signal detected on an upstream side of the internal detection edge and a downstream magnetic signal on a downstream side of the internal detection edge when an electromagnetic read head reads the printed E13B character.

As stated above, it has been found to be advantageous to include within the modified E13B character patterns at least one substantially linear void arrangement immediately adjacent and parallel to at least one internal detection edge of the E13B character to augment that detection edge. In one embodiment, such a substantially linear void arrangement may comprise one or more pluralities of voids arranged in a narrow, elongate, substantially linear formation. In another embodiment, such a substantially linear void arrangement may comprise one or more narrow, elongate individual voids. Moreover, it has been found that suitable modification of certain internal detection edges in the "1", "3", "8" and "9" E13B character patterns is particularly advantageous.

Two specific locations for substantially linear void arrangements, relative to internal detection edges within the "1", "3", "8" and "9" E13B character patterns, have been found to be especially advantageous. One such location is immediately adjacent to, and downstream, relative to a read direction, of an internal detection edge defined by a transition from some fill to less fill, measured perpendicular to the read direction. In this first case, positioning the substantially linear void arrangement(s) downstream of a transition from some fill to less fill will result in a decrease in the signal received from the portion having less fill immediately following the transition, thereby resulting in an increase in the signal difference detected across the transition. Another location is immediately adjacent to, and upstream, relative to a read direction, of a detection edge defined by a transition from some fill to more fill, measured perpendicular to the read direction. In this second case, positioning the substantially linear void arrangement(s) upstream of a transition from some fill to more fill will result in a decrease in the signal received from the portion having less fill immediately preceding the transition, thereby resulting in an increase in the signal difference detected across the transition. In certain instances, substantially linear void arrangements may be placed at both types of location within a single E13B character pattern. Details of particular implementations and patterns will be described below.

Where conventional inkjet printing and conventional paper are used, ink will tend to feather from the inked portions into the portions of the printed E13B character corresponding to the location(s) of the void arrangement(s) in the corresponding pattern, where no ink would be deposited during printing.

As a result, where the individual void(s), and the void arrangement(s) as a whole, are sufficiently small, they will be filled or substantially filled by such ink feathering, so that each such region of the E13B character printed on the substrate will become an elongate, narrow region of reduced ink density. Because of the position of the substantially linear void arrangement(s) within the character patterns, each such region of reduced ink density within the printed character will be immediately adjacent a respective internal detection edge. Where the character pattern provides for at least one substantially linear void arrangement to be located downstream, relative to the read direction, of an internal detection edge defined by a transition from some fill to less fill, measured perpendicular to the read direction, then on the resulting printed substrate the interior of that E13B character will include an elongate, narrow region of reduced ink density immediately adjacent and downstream, relative to the read direction, of that detection edge. Similarly, where the character pattern provides for at least one substantially linear void arrangement to be located upstream, relative to the read direction, of a detection edge defined by a transition from some fill to more fill, measured perpendicular to the read direction, then the interior of that E13B character will include an elongate, narrow region of reduced ink density immediately adjacent and upstream, relative to a read direction, of that detection edge. Where the character pattern provides for substantially linear void arrangements to be placed at both types of location, then the resulting printed E13B character will include elongate, narrow regions of reduced ink density at both types of location.

It should be noted that there may be a slight reduction in ink density in the region(s) of the printed E13B character from which ink feathers into the region(s) of the printed E13B character corresponding to the location of the substantially linear void arrangement(s) in the character pattern, so that the region of reduced ink density may slightly overlap the nominal position of the relevant internal detection edge. To the extent that this may occur, such slight overlap should not be taken as meaning that such a region of reduced ink density is not "upstream" or "downstream" of the respective detection edge, or that it is not "adjacent" thereto.

As noted above, two general placements for the substantially linear void arrangements within the "1", "3", "8" and "9" E13B character patterns have been found to be particularly advantageous. Particular exemplary character patterns for the "1", "3", "8" and "9" E13B characters, in accordance with which methods according to aspects of the present invention may be practiced, and in accordance with which substrates having electromagnetically recognizable E13B characters printed thereon in magnetic ink may be produced, are described in respect of FIGS. 4 and 5 and 7 to 12.

Figure 4:
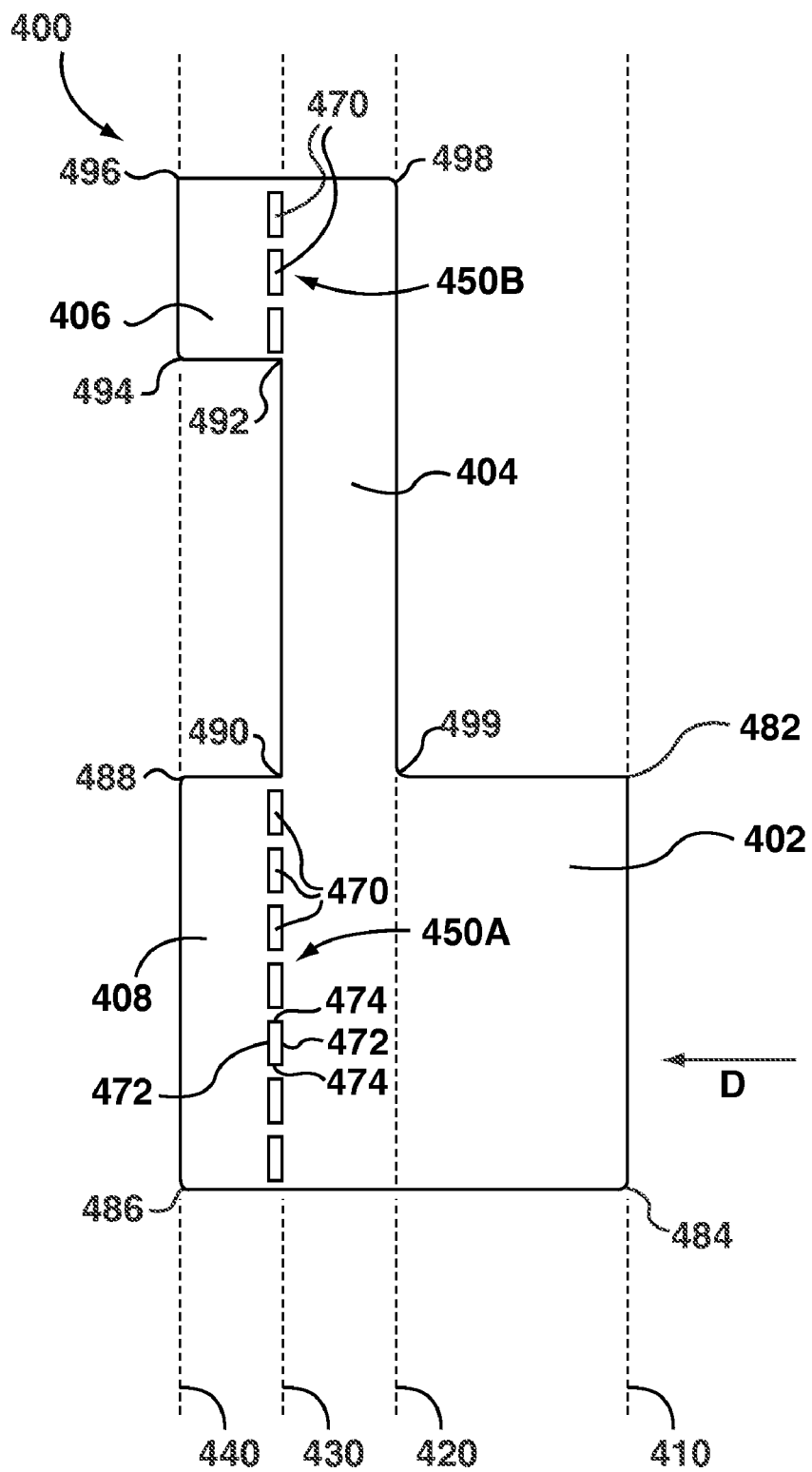
FIG. 4 shows a first exemplary embodiment of a modified character pattern for an E13B "1" character, in accordance with an aspect of the present invention.
Figure 5:
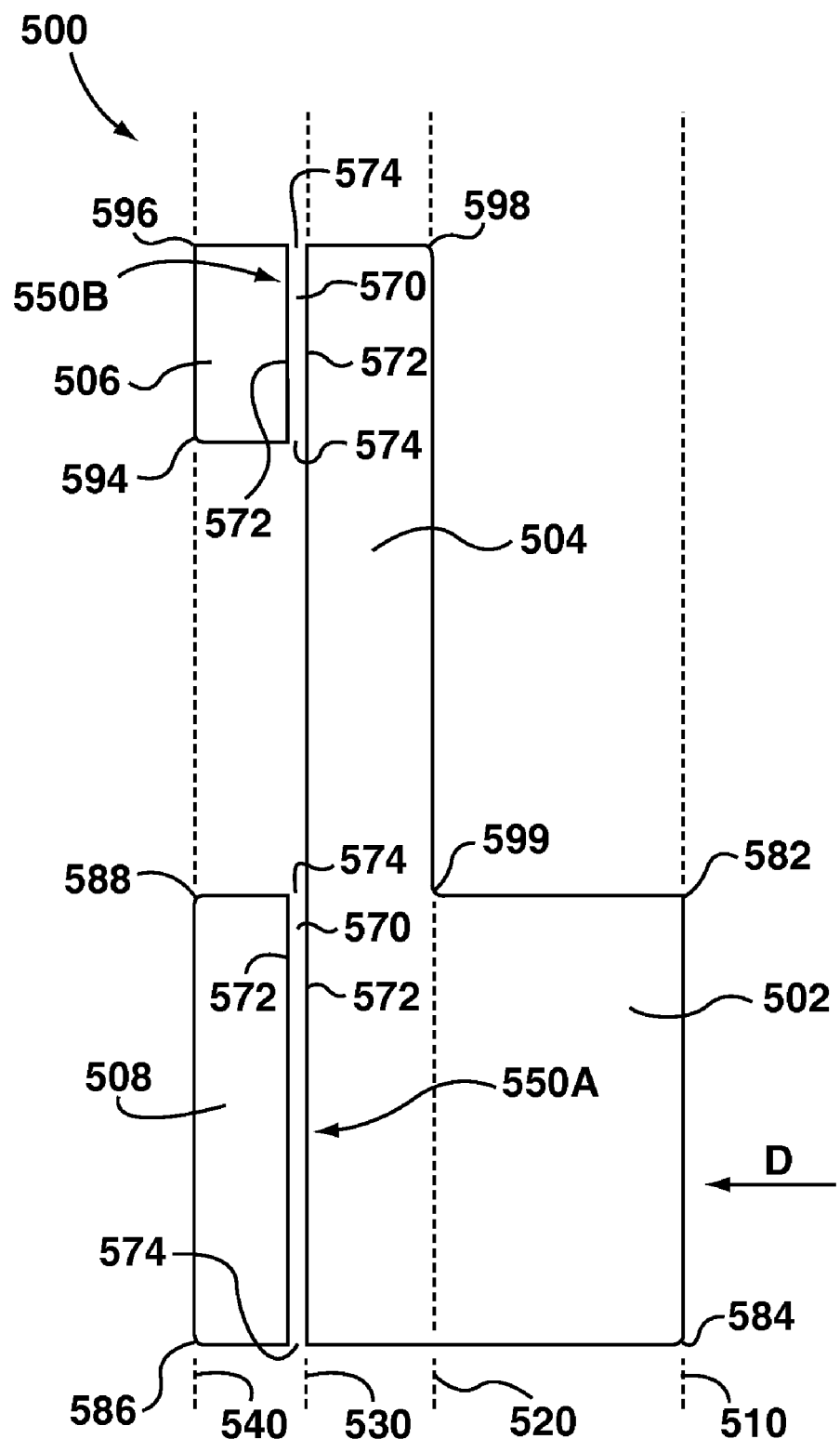
FIG. 5 shows a second exemplary embodiment of a modified character pattern for an E13B "1" character, in accordance with an aspect of the present invention.

With reference now to FIGS. 4 and 5, exemplary character patterns 400, 500 for an E13B "1" character are shown. Both such character patterns 400, 500 include at least one substantially linear void arrangement that is substantially parallel to, immediately adjacent, and downstream of, relative to the read direction D, a last internal detection edge defined by a transition from some fill to less fill, measured perpendicular to the read direction D.

In both FIGS. 4 and 5, as defined by the E13B standard, the respective pattern 400, 500 for the "1" comprises (respectively) a leading base portion 402, 502, a stem portion 404, 504, a serif portion 406, 506 and a trailing base portion 408, 508, and the shape of each "1" pattern 400, 500 respectively defines four detection edges 410 and 510, 420 and 520, 430 and 530, 440 and 540, each defined by a transition. The first detection edge 410, 510 is a boundary detection edge, defined by a transition from no fill to some fill (i.e. the beginning of the leading base portion 402, 502). The second detection edge 420, 520 is defined by the transition between the leading base portion 402, 502 and the stem portion 404, 504 and is the first internal detection edge, representing a transition from some fill (the leading base portion 402, 502) to more fill (the stem portion 404, 504). As discussed above, the amount of fill is measured perpendicularly to the read direction D. The third detection edge 430, 530 is defined between the stem portion 404, 504 and the serif portion 406, 506 and the trailing base portion 408, 508 and is the second and last internal detection edge, representing a transition from some fill (the stem portion 404, 504) to less fill (the serif portion 406, 506 and the trailing base portion 408, 508). The fourth detection edge 440, 540 is defined by the ends of the serif portion 406, 506 and the trailing base portion 408, 508, and is a boundary detection edge, representing a transition from some fill (the serif portion 406, 506 and the trailing base portion 408, 508) to no fill. In both FIGS. 4 and 5, a first substantially linear void arrangement 450A, 550A is disposed within the trailing base portion 408, 508 and a second substantially linear void arrangement 450B, 550B is disposed within the serif portion 406, 506, with both of the substantially linear void arrangements 450A, 550A, 450B, 550B disposed immediately adjacent, and downstream, relative to the read direction D, of the last internal detection edge 430, 530.

Referring now specifically to FIG. 4, it can be seen that in the "1" character pattern 400 the substantially linear void arrangements 450A, 450B each comprise a plurality of voids 470 arranged in a narrow, elongate, substantially linear formation. More particularly, each of the voids 470 within the substantially linear void arrangements 450A, 450B is a rectangular void 470 having long sides 472 and short sides 474, with each rectangular void 470 arranged so that its long sides 472 are parallel to the last internal detection edge 430.

With specific reference now to FIG. 5, in the "1" character pattern 500 the substantially linear void arrangements 550A, 550B are each a single narrow, elongate individual void 570. Alternatively, one may consider the two substantially linear void arrangements 550A, 550B to be a single notional void arrangement made up of two narrow, elongate individual voids 570. In the particular exemplary "1" character pattern shown in FIG. 5, the narrow, elongate individual voids 570 are each rectangular voids having a long side 572 and a notional short side 574 and are arranged so that their long sides 572 are parallel to the last internal detection edge 530.

As a result of inkjet printing an electromagnetically recognizable E13B "1" character, according to either of the "1" character patterns 400 or 500, onto a suitable substrate using liquid magnetic ink, the result will be a substrate having printed thereon an E13B "1" character whose interior includes at least one elongate, narrow region of reduced ink density immediately adjacent and downstream of, relative to a read direction, a last internal detection edge defined by a transition from some magnetic ink to less magnetic ink. More particularly, the printed E13B "1" character would comprise a leading base portion, a stem portion, a serif portion and a trailing base portion, with the last internal detection edge being defined by a transition between the stem portion and the serif and trailing base portions and having a first elongate, narrow region of reduced ink density disposed substantially within the base portion and a second elongate, narrow region of reduced ink density disposed substantially within the serif portion.

Figure 7:
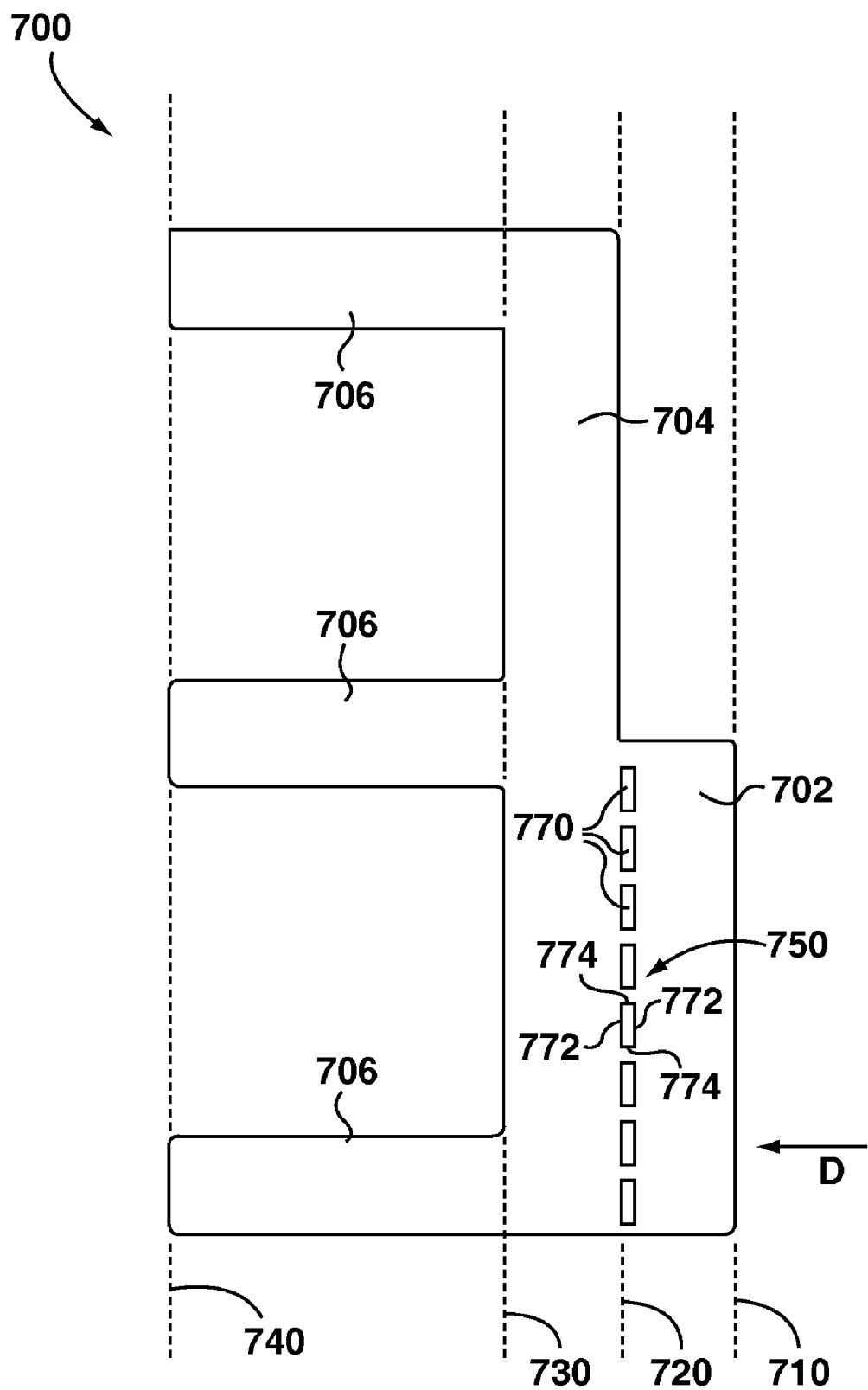
FIG. 7 shows a first exemplary embodiment of a modified character pattern for an E13B "3" character, in accordance with an aspect of the present invention.
Figure 8:
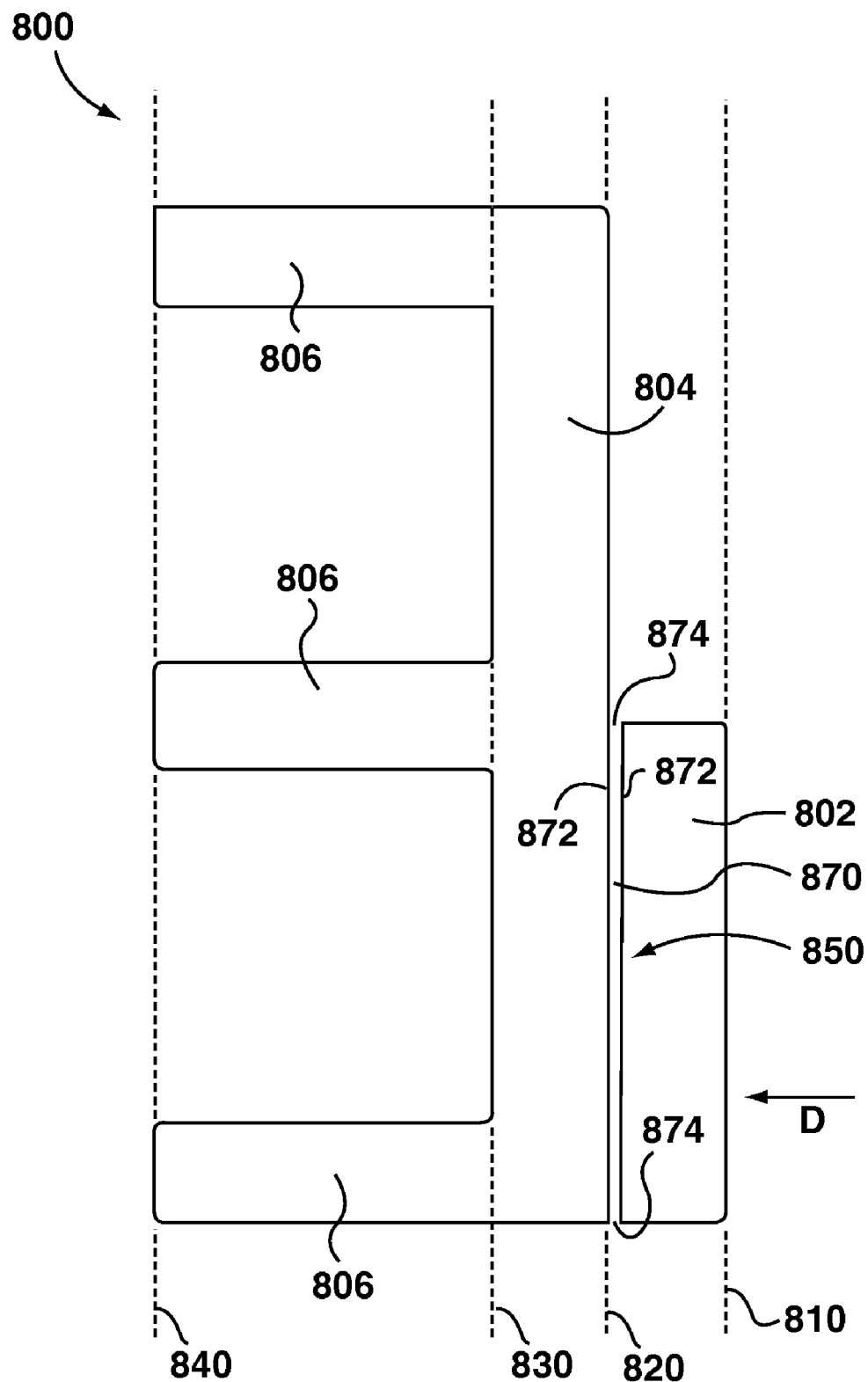
FIG. 8 shows a second exemplary embodiment of a modified character pattern for an E13B "3" character, in accordance with an aspect of the present invention.

Reference is now made to FIGS. 7 and 8. In FIGS. 7 and 8, exemplary character patterns 700, 800 for an E13B "3" are shown. Both of the E13B "3" character patterns 700, 800 include a substantially linear void arrangement that is substantially parallel to, immediately adjacent, and upstream, relative to a read direction, of a first internal detection edge defined by a transition from some fill to more fill, measured perpendicular to the read direction D.

In accordance with the E13B standard, both of the respective character patterns 700, 800 for the "3" comprise (respectively) a lower leading portion 702, 802, a stem portion 704, 804, and three horizontally extending members 706, 806. The shape of each "3" pattern 700, 800 defines (respectively) four detection edges 710 and 810, 720 and 820, 730 and 830, 740 and 840, with each such detection edge representing a transition. The first detection edge 710, 810 is a boundary detection edge, which is defined by a transition from no fill to some fill, namely the outer edge of the lower leading portion 702, 802. The second detection edge 720, 820 is the first internal detection edge, and is defined by the transition between the lower leading portion 702, 802 and the stem portion 704, 804. The second detection edge 720, 820 thus represents a transition from some fill, namely the lower leading portion 702, 802, to more fill, namely the stem portion 704, 804, again with the amount of fill measured perpendicularly to the read direction D. The third detection edge 730, 830 is defined between the stem portion 704, 804 and the three horizontally extending members 706, 806, and thus is the last internal detection edge, representing a transition from some fill (the stem portion 704, 804) to less fill (the three horizontally extending members 706, 806). The fourth detection edge 740, 840 is defined by the ends of the three horizontally extending members 706, 806, and is a boundary detection edge, as it represents a transition from some fill (the three horizontally extending members 706, 806) to no fill. Each of the character patterns 700, 800 for the "3" includes a substantially linear void arrangement 750, 850 disposed within the lower leading portion 702, 802, immediately adjacent and upstream, relative to the read direction D, of the first internal detection edge 720, 820.

With specific reference now to FIG. 7, the substantially linear void arrangement 750 in the "3" pattern 700 comprises a plurality of voids 770 arranged in a narrow, elongate, substantially linear formation, and in the specific embodiment illustrated in FIG. 7, each of the voids 770 is a rectangular void 770 which has long sides 772 and short sides 774 and the voids 770 are arranged so that their long sides 772 are parallel to the first internal detection edge 720.

Now referring specifically to FIG. 8, in the "3" character pattern 800 the substantially linear void arrangement 850 comprises a single, narrow, elongate individual void 870 which, in the particular exemplary pattern illustrated in FIG. 8, is a rectangular void 870 having long sides 872 and notional short sides 874 arranged so that the long sides 872 are parallel to the first internal detection edge 820.

When either of the patterns 700 or 800 are used by an inkjet printer to print an electromagnetically recognizable E13B "3" character onto a suitable substrate with liquid magnetic ink, the E13B "3" printed on the substrate will include an elongate, narrow region of reduced ink density immediately adjacent and upstream, relative to the read direction D, of the first internal detection edge, which is defined by a transition from some magnetic ink to more magnetic ink. Such a printed E13B "3" would comprise a lower leading portion, a stem portion, and three horizontally extending members, with the first internal detection edge being defined between the lower leading portion and the stem portion, and that printed "3" would have an elongate, narrow region of reduced ink density disposed substantially within the lower leading portion.

Figure 9:
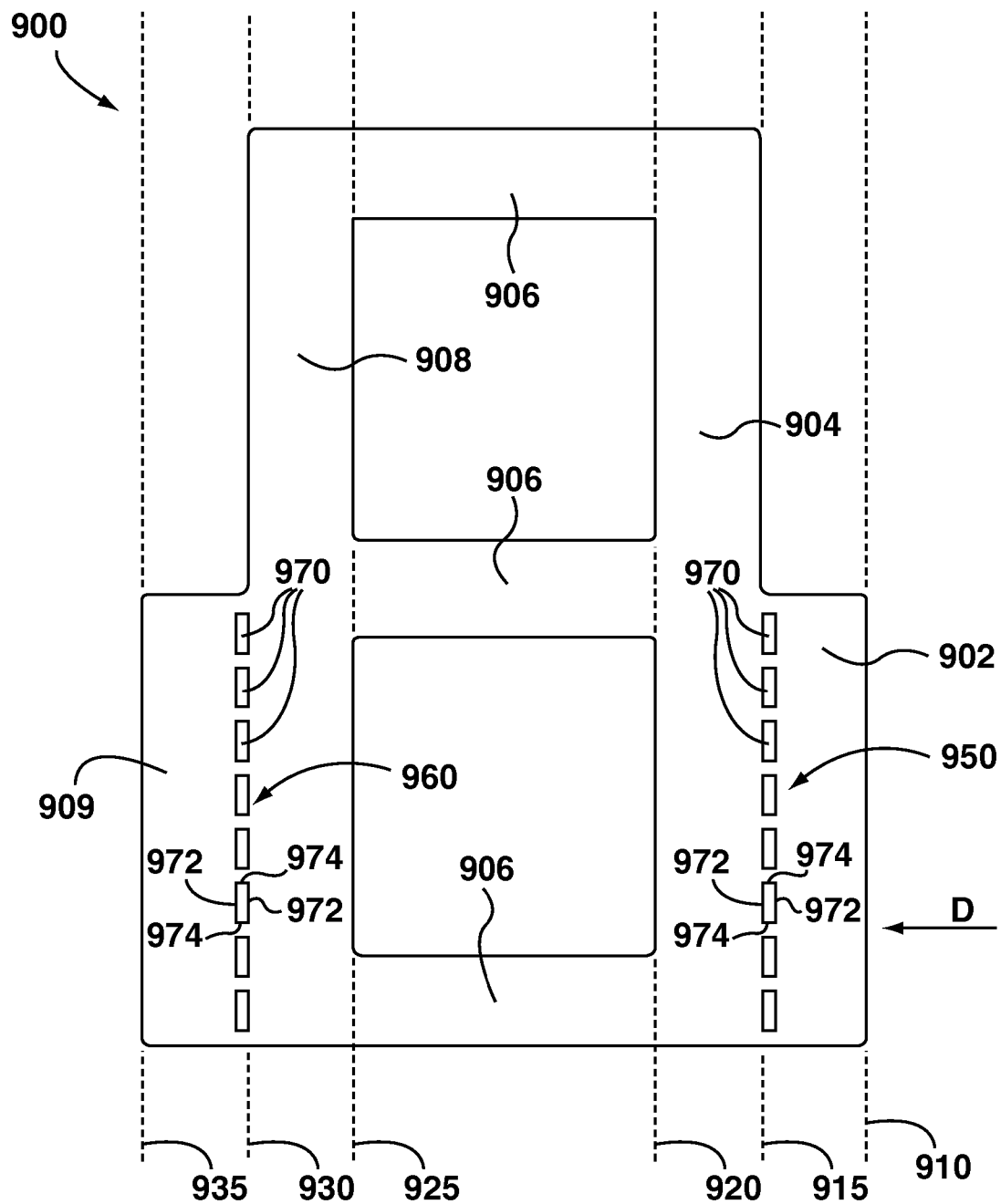
FIG. 9 shows a first exemplary embodiment of a modified character pattern for an E13B "8" character, in accordance with an aspect of the present invention.
Figure 10:
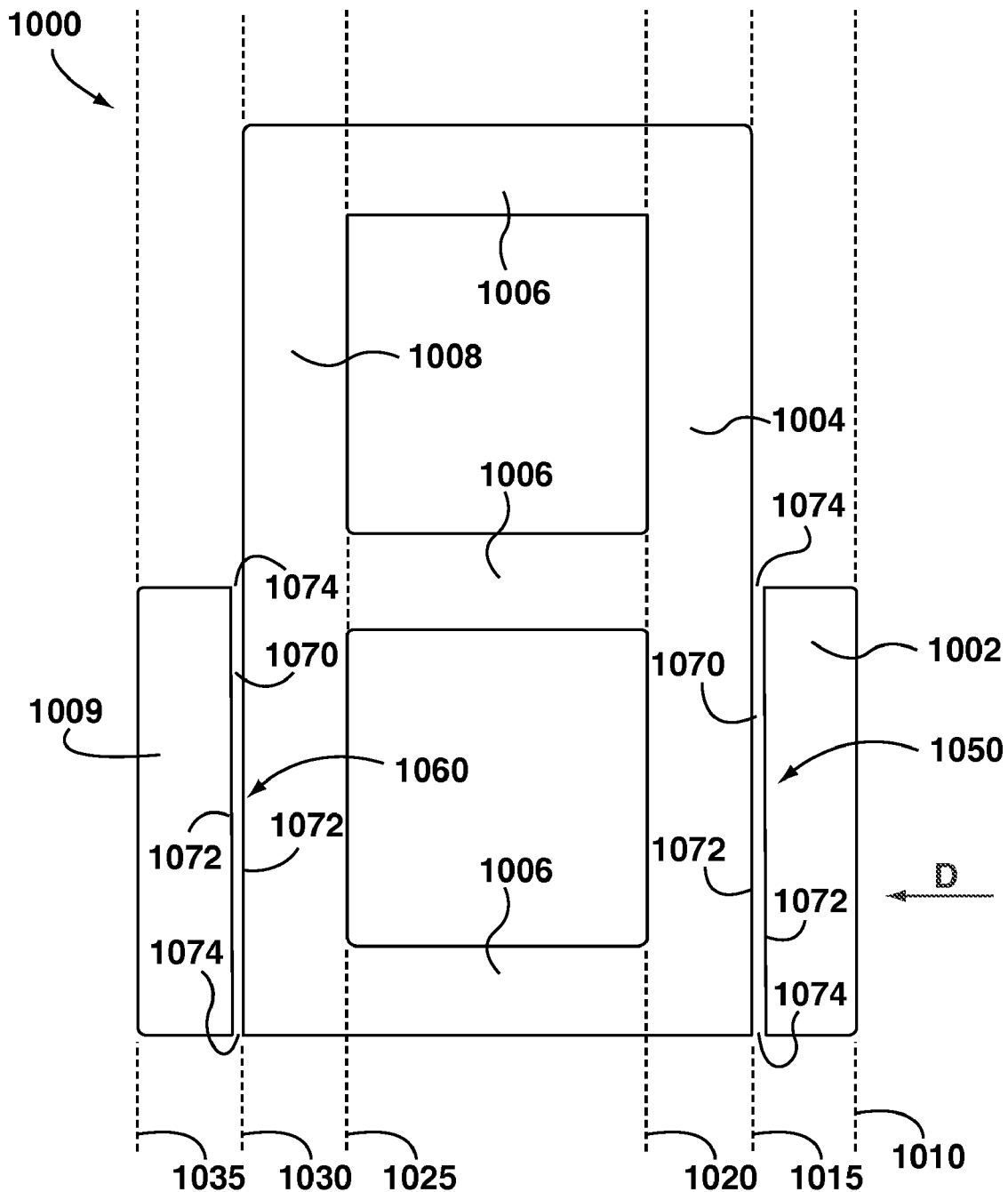
FIG. 10 shows a second exemplary embodiment of a modified character pattern for an E13B "8" character, in accordance with an aspect of the present invention.

Referring now to FIGS. 9 and 10, exemplary character patterns for an E13B "8" are shown generally at 900 and 1000, respectively. Both of the E13B "8" character patterns include first and second substantially linear void arrangements. The first substantially linear void arrangement is substantially parallel to, immediately adjacent and upstream, relative to the read direction, of the first internal detection edge, which is defined by a transition from some fill to more fill, measured perpendicular to the read direction D. The second substantially linear void arrangement is substantially parallel to, immediately adjacent and downstream of, relative to the read direction D, the last internal detection edge, which is defined by a transition from some fill to less fill, also measured perpendicular to the read direction D.

Continuing to refer to both FIGS. 9 and 10, it will be observed that both of the character patterns 900, 1000 for the "8" respectively comprise a lower leading portion 902, 1002, a first stem portion 904, 1004, three horizontally extending members 906, 1006, a second stem portion 908, 1008, and a lower trailing portion 909, 1009. The shape of the "8" character pattern 900, 1000 defines, in each case, six detection edges 910 and 1010, 915 and 1015, 920 and 1020, 925 and 1025, 930 and 1030, and 935 and 1035. The first detection edge 910, 1010 is a boundary detection edge defined by the outer edge of the lower leading portion 902, 1002 which represents a transition from no fill to some fill, namely the lower leading portion 902, 1002. The second detection edge 915, 1015 is the first internal detection edge, and is defined between the lower leading portion 902, 1002 and the first stem portion 904, 1004, thus representing a transition from some fill (the lower leading portion 902, 1002) to more fill (the first stem portion 904, 1004). The third detection edge 920, 1020, which is the second internal detection edge, is defined between the first stem portion 904, 1004 and the three horizontally extending members 906, 1006 and therefore represents a transition from some fill (the first stem portion 904) to less fill (the three horizontally extending members 906, 1006). The fourth detection edge 925, 1025, which is the third internal detection edge, is defined between the three horizontally extending members 906, 1006 and the second stem portion 908, 1008, therefore representing a transition from some fill (the three horizontally extending members 906, 1006) to more fill (the second stem portion 908, 1008). The fifth detection edge 930, 1030, which is the fourth and last internal detection edge, is defined between the second stem portion 908, 1008 and the lower trailing portion 909, 109, and is therefore representative of a transition from some fill (the second stem portion 908, 1008) to less fill (the lower trailing portion 909, 109). The sixth and last detection edge 935, 1035, which is a boundary detection edge, is defined by the outer edge of the lower trailing portion 909, 1009 and therefore represents a transition from some fill to no fill.

In both of the exemplary character patterns 900, 1000 for an E13B "8", the first substantially linear void arrangement 950, 1050 is located within the lower leading portion 902, 1002, immediately adjacent and upstream, relative to the read direction D, of the first internal detection edge 915, 1015, and the second substantially linear void arrangement 960, 1060 is located within the lower trailing portion 909, 1009, immediately adjacent and downstream, relative to the read direction D, of the last internal detection edge 930, 1030.

Referring now specifically to FIG. 9, the first substantially linear void arrangement 950 and the second substantially linear void arrangement 960 in the "8" pattern 900 each comprises a plurality of voids 970 arranged in a narrow, elongate, substantially linear formation. In the particular exemplary character pattern 900 shown in FIG. 9, each of the voids 970 is rectangular and has long sides 972 and short sides 974, the voids 970 being arranged so that their long sides 972 are parallel to the respective internal detection edges 915 and 930.

With specific reference now to FIG. 10, in the "8" character pattern 1000 both the first substantially linear void arrangement 1050 and the second substantially linear void arrangement 1060 take the form of a single, narrow, elongate individual void 1070 which, in the particular exemplary embodiment illustrated in FIG. 10, is a rectangular void 1070 having long sides 1072 and notional short sides 1074, with each of the two voids 1070 arranged so that its long side 1072 is parallel to its respective internal detection edge 1015 and 1030.

When an inkjet printer supplied with liquid magnetic ink prints an electromagnetically recognizable E13B "8" onto a suitable substrate in accordance with one of the E13B "8" character patterns, the resulting printed "8" will include two elongate, narrow regions of reduced ink density. The first elongate, narrow region of reduced ink density will be located immediately adjacent and upstream, relative to the read direction, of the first internal detection edge, which is defined by a transition from some magnetic ink to more magnetic ink, and the second elongate, narrow region of reduced ink density will be located immediately adjacent and downstream, relative to the read direction, of the last internal detection edge, which is defined by a transition from some magnetic ink to less magnetic ink. The resulting printed E13B "8" would comprise a lower leading portion, a first stem portion, three horizontally extending members, a second stem portion, and a lower trailing portion. The first internal detection edge would be defined between the lower leading portion and the first stem portion, with the first elongate, narrow region of reduced ink density being disposed substantially within the lower leading portion, and the last internal detection edge would be defined between the second stem portion and the lower trailing portion, with the second elongate, narrow region of reduced ink density disposed substantially within the lower trailing portion.

Figure 11:
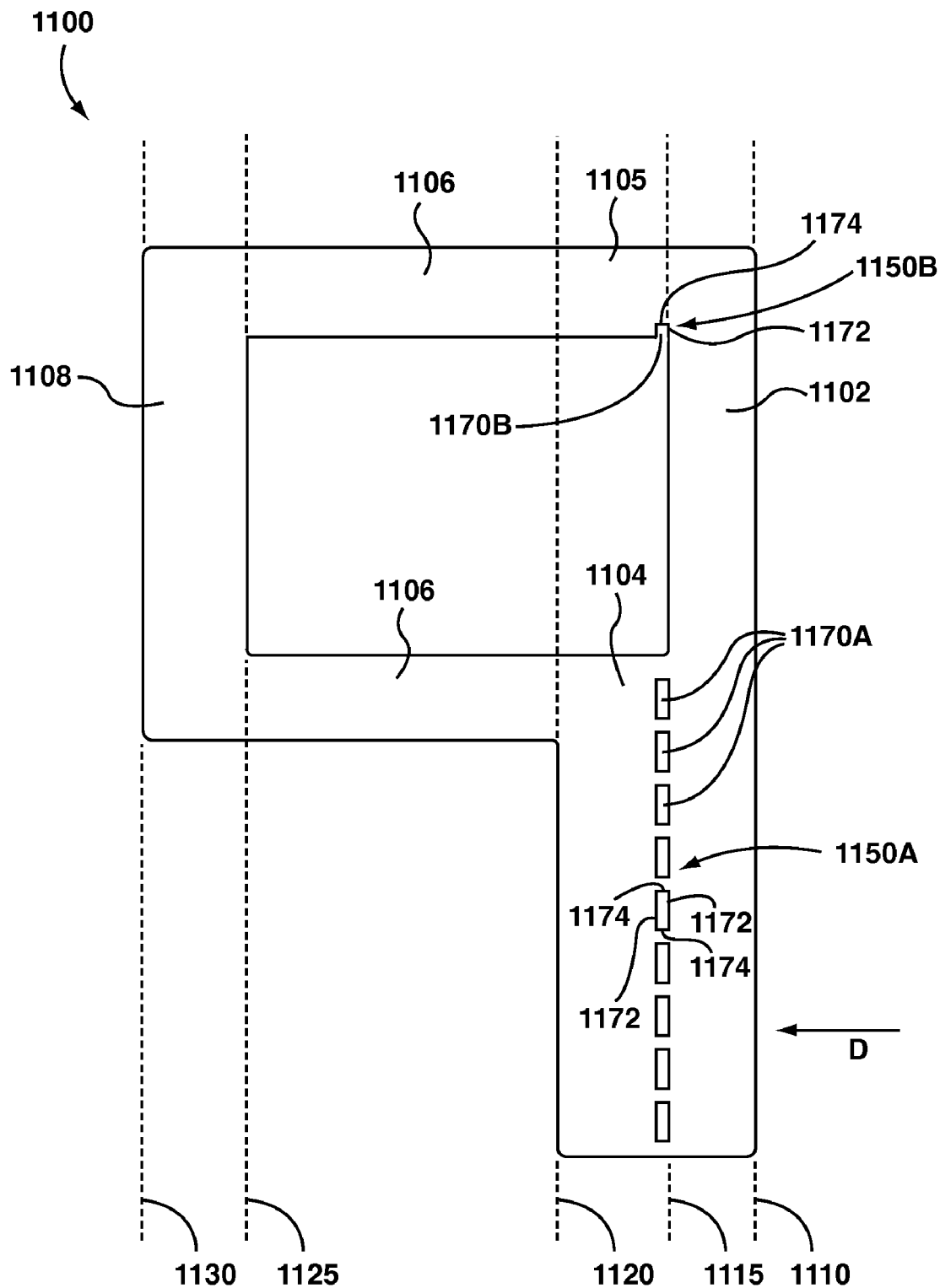
FIG. 11 shows a first exemplary embodiment of a modified character pattern for an E13B "9" character, in accordance with an aspect of the present invention.
Figure 12:
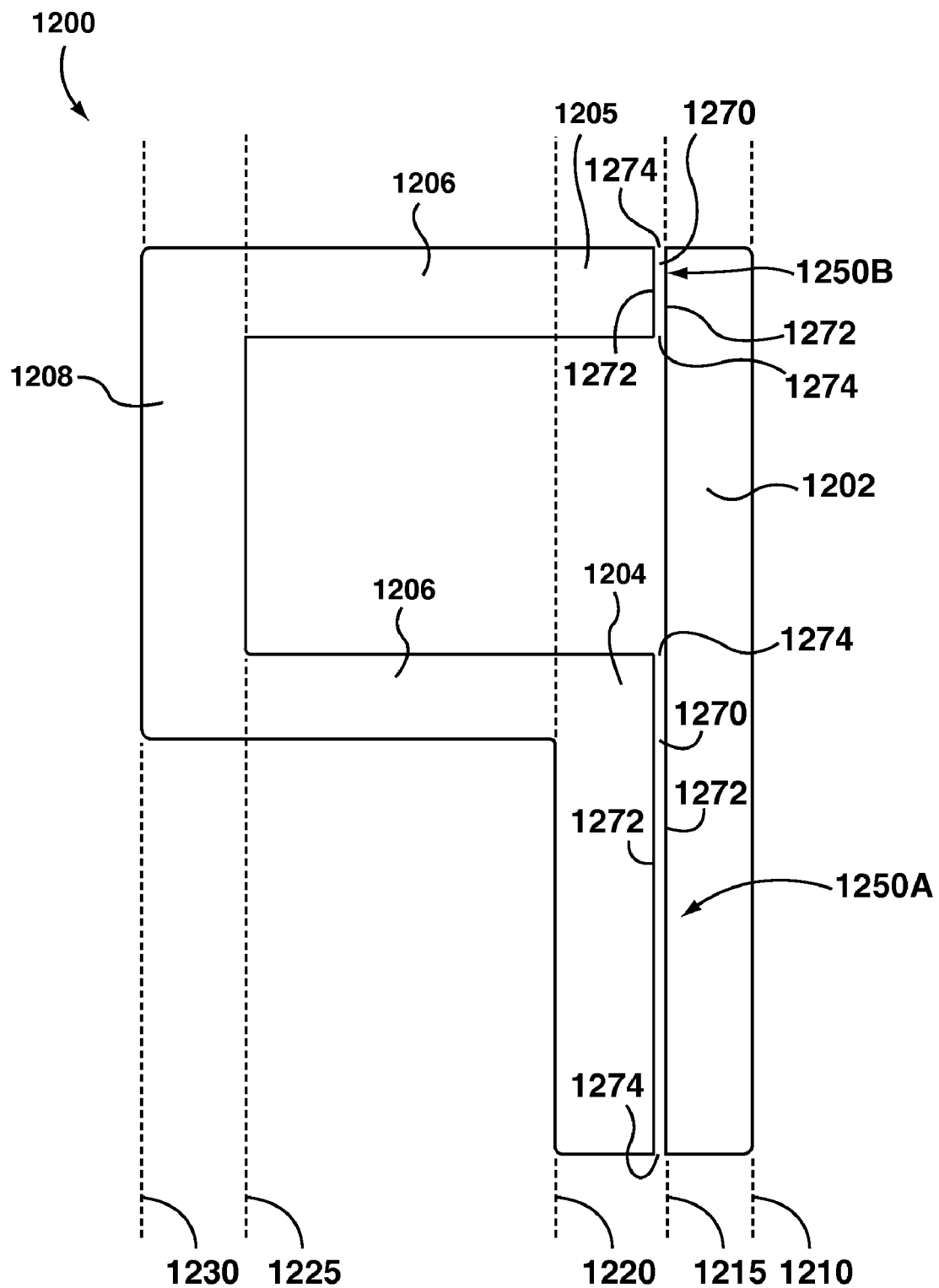
FIG. 12 shows a second exemplary embodiment of a modified character pattern for an E13B "9" character, in accordance with an aspect of the present invention.

Reference is now made to FIGS. 11 and 12, in which exemplary character patterns for an E13B "9" are shown generally at 1100 and 1200. The exemplary character patterns 1100 and 1200 both include a substantially linear void arrangement that is substantially parallel to, immediately adjacent, and downstream, relative to the read direction D, of the first internal detection edge, which is defined by a transition from some fill to less fill, measured perpendicular to the read direction D. The E13B "9" character patterns both comprise, respectively, a leading stem portion 1102, 1202, a lower stem continuation portion 1104, 1204 and upper stem continuation portion 1105, 1205, two horizontally extending members 1106, 1206 and a vertical loop completion portion 1108, 1208, as well as five detection edges 1110 and 1210, 1115 and 1215, 1120 and 1220, 1125 and 1225, and 1130 and 1230. The first detection edge 1110, 1210 is a boundary detection edge defined by the outer edge of the leading stem portion 1102, 1202, that is, a transition from no fill to some fill (the leading stem portion 1102, 1202). The second detection edge 1115, 1215 is the first internal detection edge, and is defined between the leading stem portion 1102, 1202 and the lower and upper stem continuation portions 1104, 1204 and 1105, 1205. Thus, the second detection edge 1115, 1215 is a transition from some fill (the leading stem portion 1102, 1202) to less fill (the lower and upper stem continuation portions 1104, 1204 and 1105, 1205). The third detection edge 1120, 1220, which is the second internal detection edge, is defined between the lower stem continuation portion 1104, 1204 and upper stem continuation portion 1105, 1205 on the upstream side, relative to the read direction D, and the two horizontally extending members 1106, 1206 on the downstream side. Thus, the third detection edge 1120, 1220 represents a transition between some fill (the lower and upper stem continuation portions 1104, 1204 and 1105, 1205) and less fill (the two horizontally extending members 1106, 1206). The fourth detection edge 1125, 1225 is the third internal detection edge, and is defined between the two horizontally extending members 1106, 1206 and the loop completion portion 1108, 1208. As such, the fourth detection edge is representative of a transition between some fill (the two horizontally extending members 1106, 1206) and more fill (the loop completion portion 1108, 1208). The fifth detection edge 1130, 1230 is a boundary detection edge, defined by the outer edge of the loop completion portion 1108, 1208, which is a transition from some fill (the loop completion portion 1108, 1208) to no fill. In both of the "9" character patterns 1100, 1200, a first substantially linear void arrangement 1150A, 1250A is disposed within the lower stem continuation portion 1104, 1204 and a second substantially linear void arrangement 1150B, 1250B is disposed within the upper stem continuation portion 1105, 1205, both substantially linear void arrangements being immediately adjacent and downstream of the first internal detection edge 1115, 1215.

Now referring specifically to FIG. 11, the first substantially linear void arrangement 1150A comprises a plurality of voids 1170A arranged in a narrow, elongate, substantially linear formation. The second substantially linear void arrangement 1150B comprises a single small void 1170B, although in alternative embodiments it could comprise a plurality of voids, analogous to the void arrangement 450B shown in FIG. 4, or may optionally be omitted entirely. In the particular exemplary character pattern 1100 shown in FIG. 11, each of the voids 1170A, 1170B is rectangular and has long sides 1172 and short sides 1174, the voids 1170 being arranged so that their long sides 1172 are parallel to the first internal detection edge 1115. Alternatively, the small void 1170B may be a square.

With specific reference now to FIG. 12, in the "9" character pattern 1200 both the first substantially linear void arrangement 1250A and the second substantially linear void arrangement 1250B each take the form of a single, narrow, elongate individual void 1270. In the exemplary embodiment 1200 illustrated in FIG. 12, each of the voids 1270 is rectangular, and has long sides 1272 and short sides 1274, and each of the two voids 1270 is arranged so that its long side 1272 is parallel to the first internal detection edge 1215.

When an inkjet printer uses liquid magnetic ink to print an electromagnetically recognizable E13B "9" onto a suitable substrate in accordance with one of the above-described E13B "9" character patterns 1100, 1200, the resulting printed "9" will include in its interior an elongate, narrow region of reduced ink density immediately adjacent and downstream, relative to the read direction, of the first internal detection edge, which is defined by a transition from some magnetic ink to less magnetic ink. More particularly, the printed "9" will comprise a leading stem portion, a lower stem continuation portion, an upper stem continuation portion, two horizontally extending members and a vertical loop completion portion, with the first internal detection edge defined between the leading stem portion and the lower stem continuation portion. An elongate, narrow region of reduced ink density will be disposed within the lower stem continuation portion of the printed E13B "9". Optionally, an additional region of reduced ink density may be disposed within the upper stem continuation portion, with that additional region of reduced ink density also being immediately adjacent and downstream, relative to the read direction, of the first internal detection edge.

Figure 6A:
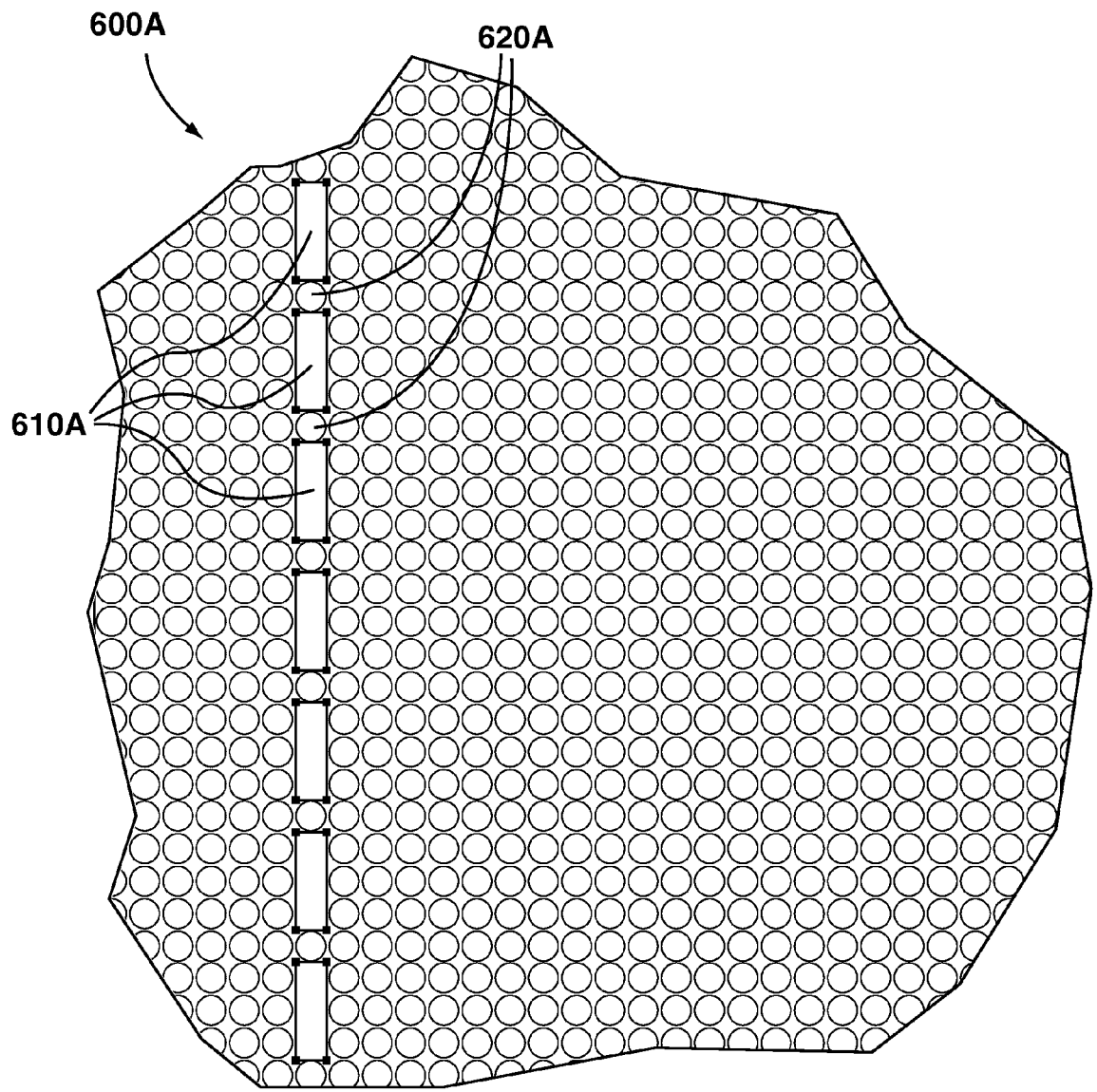
FIG. 6A shows a detailed view of a first exemplary void arrangement, in accordance with an aspect of the present invention.

With reference now to FIG. 6A, in a particular exemplary implementation of the above-described method, the exemplary patterns 400 (for the "1"), 700 (for the "3"), 900 (for the "8") and 1100 (for the "9") may each be a 600 dots per inch (dpi) bitmap pattern, denoted generically in FIG. 6A as 600A. As described above, in the exemplary patterns 400, 700, 900 and 1100 the substantially linear void arrangements 450A, 450B, 750, 950, 960 and 1150A and 1150B each comprise a plurality of individual rectangular voids 470, 770, 970 and 1170A and 1170B, respectively. In the exemplary 600 dpi bitmap implementation of the exemplary patterns 400, 700, 900 and 1100, each rectangular void 470, 770, 970 and 1170A comprises a three bit by one bit rectangle 610A, and each rectangle 610A in each substantially linear void arrangement is vertically separated by one filled bit 620A.

Several experimental trials were carried out to test the efficacy of inkjet printing of E13B characters using character patterns modified in accordance with aspects of the present invention, as compared with inkjet printing of E13B characters using unmodified character patterns as known in the prior art.

Two commercially available desktop inkjet printers were used in the experimental trials, namely a Versajette M300 (actually a re-badged Lexmark Z1300 printer) offered by G7 Productivity Systems and a DeskJet® 6940 ("DJ6940") offered by Hewlett Packard Company, having a head office at 3000 Hanover Street, Palo Alto, Calif. 94304-1185 USA. Both printers were provided with Versaink nano™ aqueous MICR ink in appropriate cartridges, obtained from G7 Productivity Systems. (As noted above, the Versajette M300 printer is offered by G7 Productivity Systems as part of a check printing kit, which also includes check paper, software and a cartridge containing Versaink nano™ aqueous MICR ink, under the brand VersaCheck®) The paper used was Xerox Multipurpose Recycled Paper offered under part number 3R6298, cut from 8.5×14 inch dimension to 8.5×11 inch dimension.

For each test run, a test pattern consisting of 63 "1" characters in a single line, spaced in accordance with ANS X9.100-20-2006, was printed. Test runs were carried out, on each printer, for three different types of E13B "1" character pattern. The first E13B "1" character pattern was a standard E13B "1" character pattern as provided in the prior art, as shown in FIG. 1B (referred to in discussion of the experimental results as the "Prior Art E13B '1' character pattern"). The second E13B "1" character pattern was an E13B "1" modified in accordance with an aspect of the present invention to have substantially linear rectangular void arrangements 450A, 450B comprising a plurality of rectangular voids 470, as shown in FIG. 4 and in greater detail in FIG. 6A (referred to in discussion of the experimental results as the "FIG. 4 E13B '1' character pattern"). The third E13B "1" character pattern was an E13B "1" modified in accordance with an aspect of the present invention to have two substantially linear void arrangements 550A, 550B each comprising a single narrow, elongate individual void 570, as shown in FIG. 5 (referred to in discussion of the experimental results as the "FIG. 5 E13B '1' character pattern"). The character pattern used in each case had a 600 dpi bitmap resolution, with the rectangular voids 470 in the FIG. 4 E13B "1" character pattern being as shown in FIG. 6A, and the narrow, elongate individual voids 570 in the FIG. 5 E13B "1" character pattern each having a width of one bit.

For each printer, after carrying out several initial trials to assess various print conditions, a number of experimental print runs were carried out under different print conditions, in order to simulate different levels of print speed and print quality. References to settings are to settings provided by the respective printer driver software. The experimental print runs were analyzed using an MICR Qualifier GT (model #2453F8) manufactured by RDM Corporation, having an address at 4-608 Weber Street North, Waterloo, Ontario, Canada, N2V 1K4.

Two main sets of experimental trials were carried out. A first set of experimental trials was directed toward a detailed statistical analysis of the effect of aspects of the present invention on the characteristics of printed E13B MICR characters which influence correct recognition. A second set of experimental trials was directed toward measuring the effect of aspects of the present invention on the actual identification of characters printed under more stressful print conditions, such as higher speed printing and/or lower quality printing.

In order to perform a detailed statistical analysis of the effect of aspects of the present invention on the characteristics of printed E13B MICR characters which influence correct recognition, after carrying out preliminary tests, one print run was carried out using the DJ6940 printer for each of the Prior Art E13B "1" character pattern, the FIG. 4 E13B "1" character pattern and the FIG. 5 E13B "1" character pattern. The HP DJ6940 printer was configured in the "plain" paper setting, "best" quality setting, and "medium-low" ink volume setting. The results were analyzed using the RDM MICR Qualifier GT, and all characters were properly recognized.

The peak height and peak ratio were calculated for the peak (the "measured peak") corresponding to the detection edges 130 (for the Prior Art E13B "1" character pattern), 430 (for the FIG. 4 E13B "1" character pattern) and 530 (for the FIG. 5 E13B "1" character pattern), in each case by comparison to a reference point. Thus, the measured peak corresponds generally to the peak 230 in FIG. 2 and the "peak" 330 in FIG. 3. The height of the measured peak was calculated by taking the absolute Y-value of the measured peak (measured in signal level units) and subtracting the absolute Y-value of the reference point. The peak ratio was calculated as the absolute value of the measured peak divided by the absolute value of the reference point. Where the measured peak was clearly defined, so that the measured waveform had a form similar to the waveform shown in FIG. 2, the reference point was the waveform crest immediately to the right of the measured peak, corresponding generally to point 235 in FIG. 2. In such cases, the peak height would be positive, and the peak ratio would be greater than 1. Where the measured peak was not clearly visible and hence the corresponding crest was not discernable by visual inspection, so that the measured waveform had a form similar to the waveform shown in FIG. 3, the height of the measured peak was that determined by the RDM MICR Qualifier GT, and the reference point was taken as the point that was four (4) X-axis units (thousandths of an inch) to the right of the X-axis position identified by the RDM MICR Qualifier GT as corresponding to the measured peak. Thus, the reference point would correspond generally to point 335 in FIG. 3. In such cases, the peak height would be negative and the peak ratio would be less than 1. The following results were obtained:

| Character Pattern | Average Peak Height | Peak Ratio |
|---|---|---|
| Prior Art E13B "1" | 11.9 | 1.23 |
| FIG. 4 E13B "1" | 26.5 | 1.64 |
| FIG. 5 E13B "1" | 30.8 | 1.72 |

An F-test was used to compare the results pair-wise, i.e. Prior Art E13B "1" character pattern vs. FIG. 4 E13B "1" character pattern, Prior Art E13B "1" character pattern vs. FIG. 5 E13B "1" character pattern, and FIG. 4 E13B "1" character pattern vs. FIG. 5 E13B "1" character pattern. For these data sets, an F-value greater than 6.63 indicates significant difference at a 99% confidence interval and leads to the conclusion that the choice of character pattern results in an observable impact on the average peak height and average peak ratio. The results were:

| Comparison | $F_0$, Peak Height | $F_0$, Ratio |
|---|---|---|
| Prior Art E13B "1" vs. FIG. 4 E13B "1" | 96 | 105 |
| Prior Art E13B "1" vs. FIG. 5 E13B "1" | 122 | 97 |
| FIG. 4 E13B "1" vs. FIG. 5 E13B "1" | 6.45 | 2.05 |

As reflected in the table above, at a 99% confidence level, no statistically significant difference in average peak height and average peak ratio was identified between the FIG. 4 E13B "1" character pattern and the FIG. 5 E13B "1" character pattern. However, both the FIG. 4 E13B "1" character pattern and the FIG. 5 E13B "1" character pattern have statistically significantly larger average peak height and peak/minimum ratios than the Prior Art E13B character pattern. The peak corresponding to the detection edges 130 (for the Prior Art E13B "1" character pattern), 430 (for the FIG. 4 E13B "1" character pattern) and 530 (for the FIG. 5 E13B "1" character pattern) has been empirically determined to be most problematic when inkjet printing at higher speed and/or lower quality, in that this peak tends to look more like peak 330 in FIG. 3 than peak 230 in FIG. 2 under those conditions. Therefore, improving the intensity of the peak would be expected to improve readability. Accordingly, while the high quality print setting used for the above print runs did not produce any unrecognizable characters, on more stressful print runs, such as when printing at higher speeds or lower quality, the use of E13B character patterns in accordance with aspects of the present invention (such as the FIG. 4 E13B "1" character pattern and the FIG. 5 E13B "1" character pattern) should produce a reduction in the number of unrecognizable characters, as compared to the Prior Art E13B "1" character pattern.

To simulate faster and/or lower quality print runs, a total of five (5) print runs were carried out on the Versajette M300, using the "plain" paper setting and the "normal" quality setting. These print runs consisted of one run of characters printed according to the Prior Art E13B "1" character pattern, two runs of characters printed according to the FIG. 4 E13B "1" character pattern and two runs of characters printed according to the FIG. 5 E13B "1" character pattern. Using the RDM MICR Qualifier GT, for each experimental print run, the number of "unrecognized" characters and "flagged" characters was recorded. A character would be "flagged" by the RDM MICR Qualifier GT when its waveform differed substantially from the standard waveform. This can result from factors such as reduced detection edge acuity, or from at least one dimension of that character exceeding the ±0.003 inch (approximately 76.2 micrometers) stroke width tolerance specified by ANS X9.100-20-2006. The following results were obtained (in each case, signal strength was within normal parameters):

| Character Pattern | Average % Signal Strength (vs. ANS X9.100-20-2006) | Flagged | Unrecognizable |
|---|---|---|---|
| Prior Art E13B "1" | 181 | 7 | 22 |
| FIG. 4 E13B "1" | 150 | 6 | 5 |
| FIG. 4 E13B "1" | 156 | 23 | 4 |
| FIG. 5 E13B "1" | 162 | 4 | 1 |
| FIG. 5 E13B "1" | 129 | 1 | 0 |

As can be seen, printing the "1" characters according to the FIG. 4 E13B "1" character pattern and the FIG. 5 E13B "1" character pattern resulted in a substantial reduction in the number of unrecognizable characters, along with a generalized decrease in the number of "flagged" characters.

As a further simulation of a lower quality and/or faster print run, a total of three (3) print runs were carried out on the DJ6940, one each for the Prior Art E13B "1" character pattern, the FIG. 4 E13B "1" character pattern and the FIG. 5 E13B "1" character pattern. For these print runs, the "plain" paper setting, "medium high" ink volume setting and "best" quality setting were used. The following results were obtained:

| Character Pattern | Average % Signal Strength (vs. ANS X9.100-20-2006) | Flagged | Unrecognizable |
|---|---|---|---|
| Prior Art E13B "1" | 281 | 4 | 3 |
| FIG. 4 E13B "1" | 285 | 0 | 1 |
| FIG. 5 E13B "1" | 193 | 0 | 0 |

In this case, both the FIG. 4 E13B "1" character pattern and the FIG. 5 E13B "1" character pattern show an improvement over the Prior Art E13B "1" character pattern in terms of both the number of "flagged" characters and the number of unrecognizable characters.

Similar tests were carried out for "3", "8" and "9" characters, printed according to the exemplary patterns for those characters illustrated herein, although without a formal statistical analysis. In particular, such characters were printed in a "389389389. . ." string and then analyzed using the RDM MICR Qualifier GT. These tests also indicated that at higher print quality, there were no unrecognizable characters for any of the characters printed, including both characters printed according to prior art character patterns and characters printed according to character patterns incorporating aspects of the present invention (both void arrangements comprising a plurality of rectangular voids and void arrangements comprising a single narrow, elongate individual void). In addition, these tests showed that for faster/lower quality printing, characters printed according to character patterns incorporating aspects of the present invention produced fewer unrecognizable characters than characters printed according to prior art character patterns. These tests also showed a larger number of flags for the characters printed according to character patterns incorporating aspects of the present invention than for the characters printed according to prior art character patterns on both printers, with the Versajette M300 producing a greater number of flags than the DJ6940.

Thus, depending on the printer used, there may be an increase in the number of flagged characters resulting from implementing aspects of the present invention, and it appears that this will depend on the particular printer and the selected print quality. Without being limited by theory, it is believed that use of character patterns according to aspects of the present invention may, while improving the acuity of one or more detection edges and hence improving recognition, also increase the electromagnetic visibility of other (pre-existing) flaws in the printed characters resulting from inkjet printing, particularly when printing at lower quality. In particular, and without being limited by theory, it is believed that certain printers introduce shape defects into the MICR characters, but that the adverse effect of these shape defects is concealed by poor detection edge acuity resulting from absorption of the liquid ink into the paper. This poor detection edge acuity frequently results in waveforms having corresponding deviations in peak amplitude and position which exceed the relevant tolerances, and the printed characters are "flagged", or not recognized at all, because of these deviations. Because the MICR characters are "flagged" or not recognized because of poor detection edge acuity, the less pronounced waveform deviations caused by the (pre-existing) printer-introduced shape defects remain undetected. It is further believed, again without being limited by theory, that the deviations in peak amplitude and position resulting from poor detection edge acuity are obviated or eliminated when printing MICR characters according to character patterns incorporating aspects of the present invention, and that with the waveform deviations resulting from poor detection edge acuity removed or at least reduced, the waveform deviations resulting from the shape defects can then be detected. It is believed that it is these pre-existing shape defects which resulted in at least some of the MICR characters printed according to the FIG. 4 E13B "1" character pattern and the FIG. 5 E13B "1" being "flagged".

It is nonetheless advantageous if the number of unrecognizable characters can be reduced, even if the number of flagged characters is increased as a result. From the perspective of electromagnetic recognition of an MICR character, a flagged character is better than an unrecognizable character. More particularly, the "flagging" of characters is an analytical function provided by the RDM MICR Qualifier GT (and similar devices) for use in MICR quality control, whereas in industrial applications (e.g. in a financial institution) a MICR reader would typically operate on a "pass/fail" basis, with no intermediate "flagged" category. As such, a font modification in accordance with aspects of the present invention which decreases the number of unrecognizable characters, even while increasing the number of "flags" identified by an analyzer like the RDM MICR Qualifier GT, would be expected to result in a reduction of the number of checks rejected by an MICR reader in a financial institution.

Figure 6B:
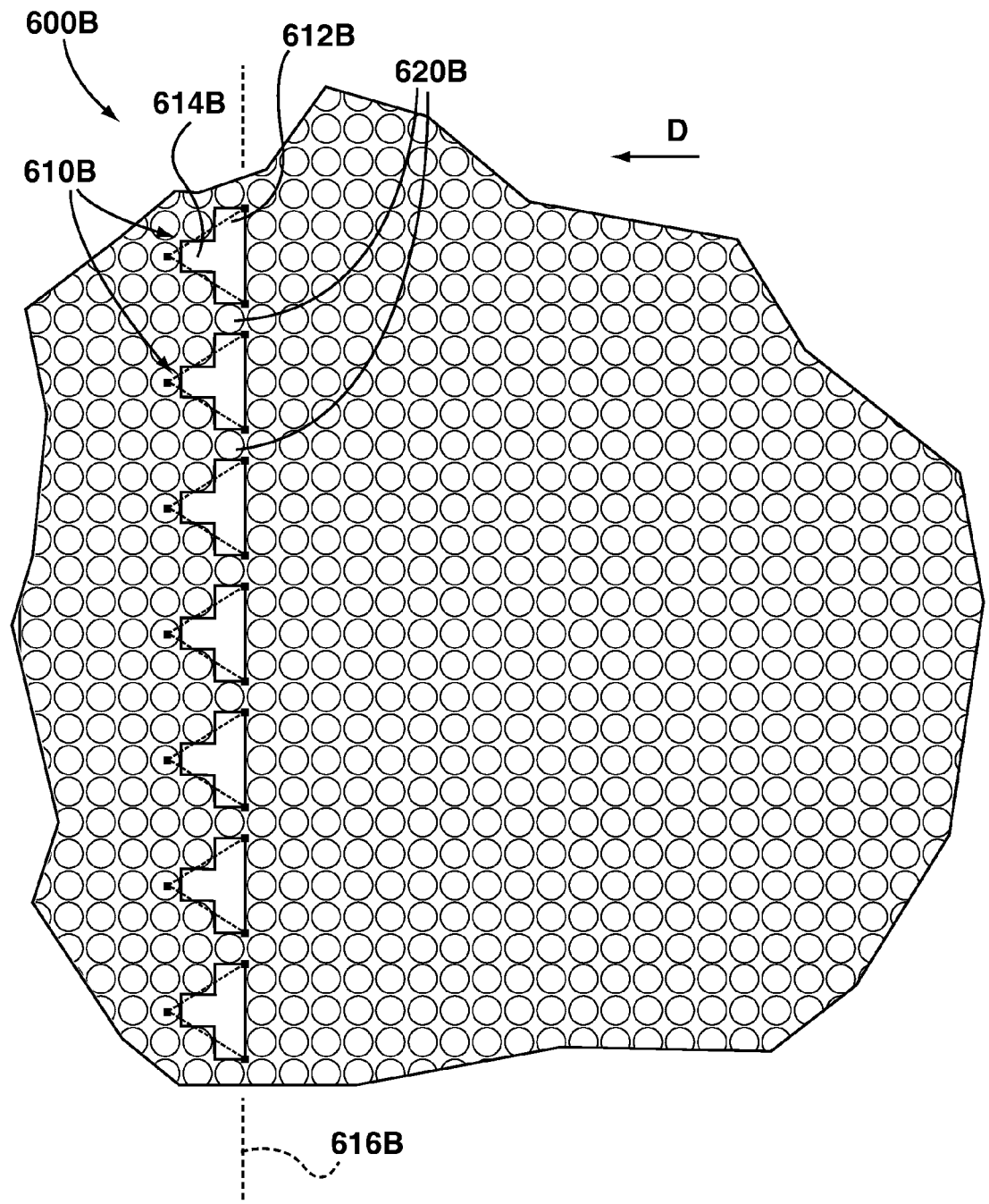
FIG. 6B shows a detailed view of a second exemplary void arrangement, in accordance with an aspect of the present invention.

It is to be appreciated that void shapes other than rectangular voids may also be used, without departing from the scope of the present invention. For example, with reference now to FIG. 6B, in an alternate embodiment 600B of a 600 dpi bitmap pattern, triangular voids 610B are used. Thus, in alternate embodiments (described in greater detail below in respect of FIGS. 13 to 16) triangular voids such as the triangular voids 610B shown in FIG. 6B could replace the individual rectangular voids 470, 770, 970 and 1170A and 1170B in the substantially linear void arrangements 450A, 450B, 760, 950, 960 and 1150A and 150B in the exemplary patterns 400, 700, 900 and 1100. The triangular voids 610B each comprise a three-bit base 612B and a one bit tip 614B, and thus, although not perfectly triangular in the geometric sense, are as triangular as possible given the 600 dpi resolution and the size of the voids. The triangular voids 610B are each oriented and positioned so that the tip 614B points away from the relevant internal detection edge, denoted generically in FIG. 6B by the reference numeral 616B, with the base 612B being parallel with the internal detection edge 616B. Thus, where a void arrangement comprising triangular voids is positioned downstream of a detection edge, as shown in FIG. 6B, the triangular voids will point in the read direction D. Conversely, where a void arrangement comprising triangular voids is positioned downstream of a detection edge (not shown in FIG. 6B; see FIGS. 14 and 15) the triangular voids will point opposite to the read direction D. The triangular voids 610B are vertically separated from one another by one filled bit 620B.

With reference now to FIGS. 13 to 16, exemplary embodiments of modified character patterns for E13B characters 1, 3, 8 and 9 are shown in which triangular voids, such as those described in respect of FIG. 6B, are used in place of rectangular voids (such as those described in respect of FIG. 6A). Each of the modified E13B character patterns shown in FIGS. 13 to 16 has an interior that is substantially completely filled, defines a plurality of internal detection edges, and includes at least one substantially linear void arrangement, in the form of a line of triangular voids, immediately adjacent and parallel to at least one internal detection edge. As will be seen in FIGS. 13 to 16, in each character pattern the triangular voids are arranged into one or more narrow, elongate, substantially linear formations. Where conventional paper types are used, each void arrangement is substantially filled by ink feathering to produce a corresponding elongate, narrow region of reduced ink density. In each case, the triangular voids are sized, and the line (or lines) of triangular void arrangements is arranged and positioned relative to the corresponding internal detection edge, to amplify a difference between an upstream magnetic signal detected on an upstream side of the internal detection edge and a downstream magnetic signal detected on a downstream side of the internal detection edge when an electromagnetic read head reads the resulting printed E13B character.

Figure 13:
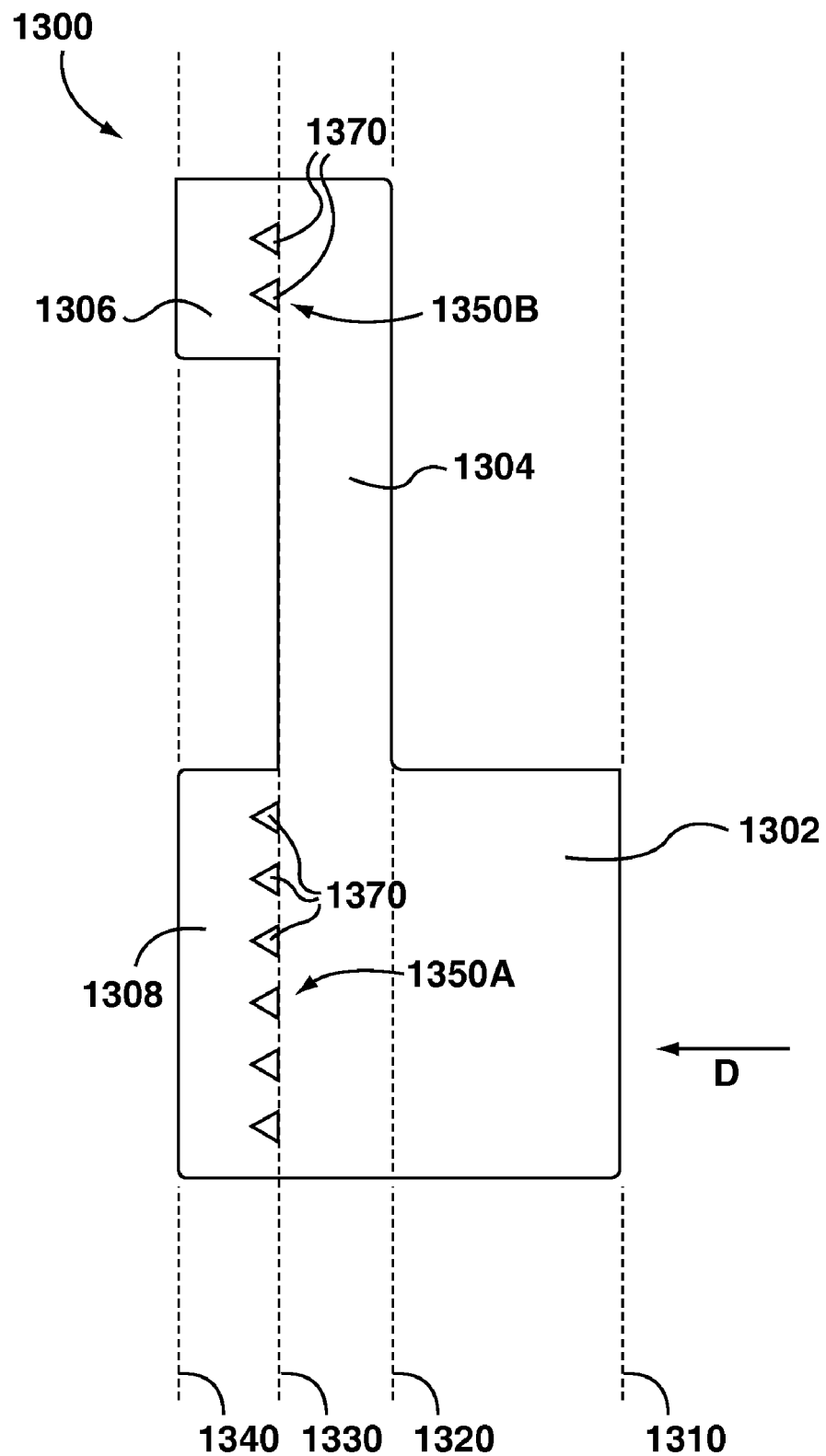
FIG. 13 shows a third exemplary embodiment of a modified character pattern for an E13B "1" character, in accordance with an aspect of the present invention.

FIG. 13 shows an exemplary modified character pattern 1300 for an E13B "1", including a leading base portion 1302, a stem portion 1304, a serif portion 1306 and a trailing base portion 1308, defining four detection edges 1310, 1320, 1330 and 1340, analogous to the E13B "1" shown and described in FIGS. 1B, 4 and 5. Substantially linear arrangements 1350A, 1350B of triangular voids 1370 are positioned substantially parallel to, immediately adjacent, and downstream, relative to the read direction D, of the last internal detection edge 1330, which is defined by a transition from some fill (stem portion 1304) to less fill (serif portion 1306 and trailing base portion 1308). The first void arrangement 1350A is disposed within the trailing base portion 1308 and the second void arrangement 1350B is disposed within the serif portion 1306.

Figure 14:
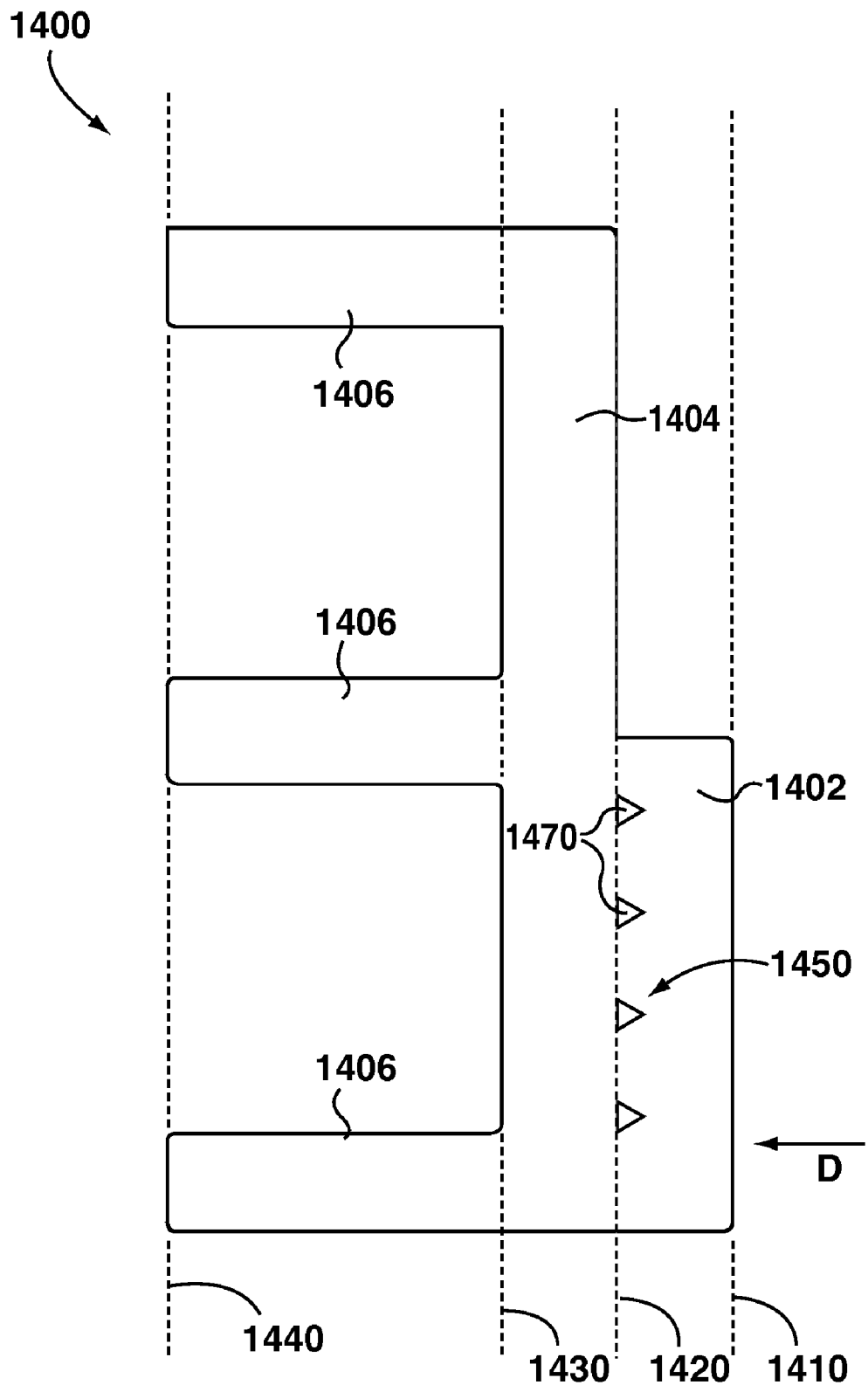
FIG. 14 shows a third exemplary embodiment of a modified character pattern for an E13B "3" character, in accordance with an aspect of the present invention.

Referring now to FIG. 14, an exemplary modified character pattern for an E13B "3" is indicated generally at 1400, and comprises a lower leading portion 1402, a stem portion 1404, and three horizontally extending members 1406. The E13B "3" character pattern 1400 defines detection edges 1410, 1420, 1430 and 1440, similarly to the E13B "3" character patterns illustrated in FIGS. 7 and 8. A substantially linear arrangement 1450 of triangular voids 1470 is positioned substantially parallel to, immediately adjacent, and upstream of, relative to the read direction D, the first internal detection edge 1420. The first internal detection edge 1420 is defined by a transition from some fill (the lower leading portion 1402) to more fill (the stem portion 1404), measured perpendicular to the read direction D, and the void arrangement 1450 is disposed within the lower leading portion 1402.

Figure 15:
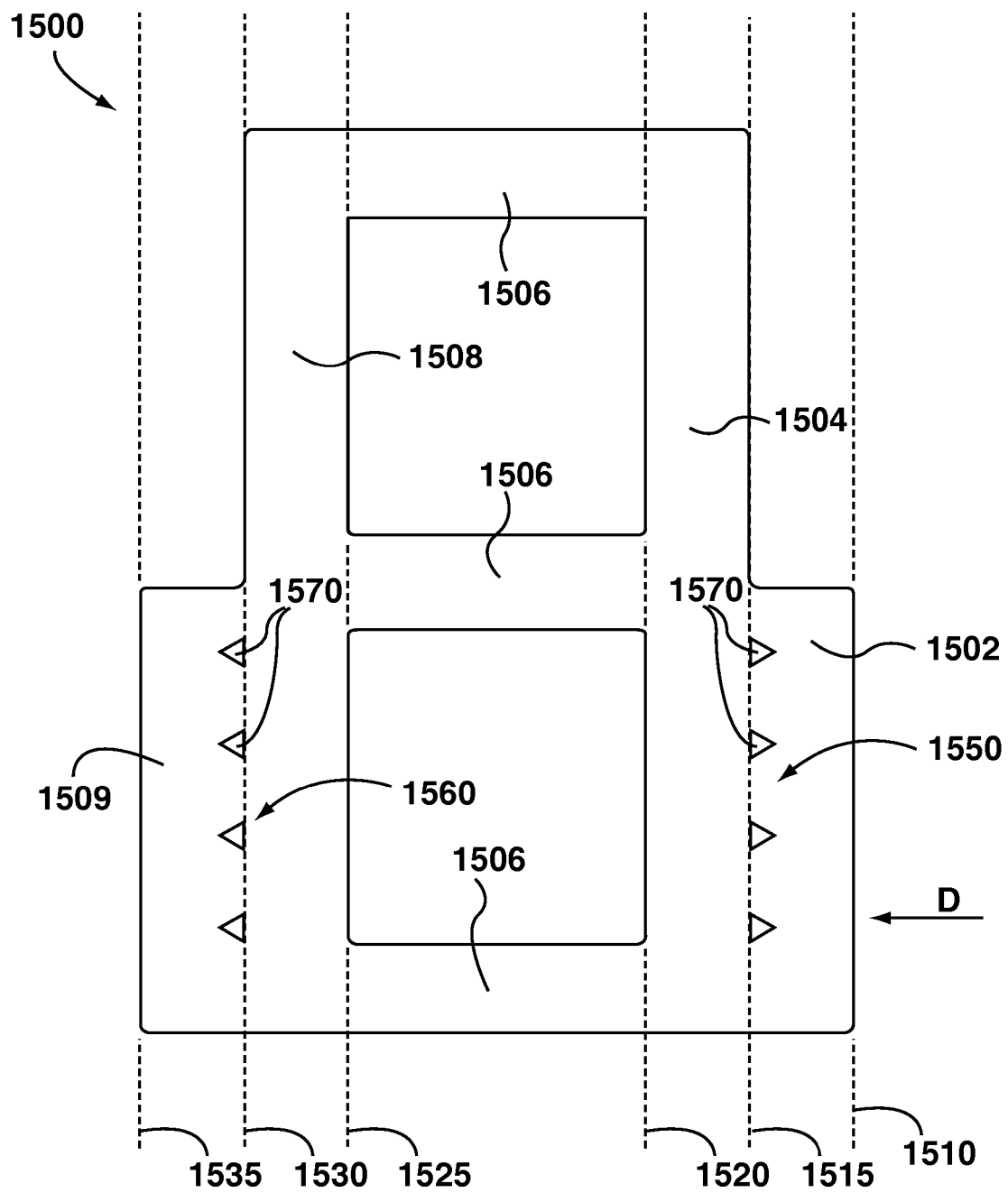
FIG. 15 shows a third exemplary embodiment of a modified character pattern for an E13B "8" character, in accordance with an aspect of the present invention.

Reference is now made to FIG. 15, which shows an exemplary modified character pattern 1500 for an E13B "8". The modified E13B "8" character pattern 1500 comprises a lower leading portion 1502, a first stem portion 1504, three horizontally extending members 1506, a second stem portion 1508, and a lower trailing portion 1509, and defines detection edges 1510, 1515, 1520, 1525, 1530 and 1535, analogous to the exemplary E13B "8" character patterns illustrated in FIGS. 9 and 10. A first substantially linear arrangement 1550 of triangular voids 1570 is positioned substantially parallel to, immediately adjacent and upstream of, relative to the read direction D, the first internal detection edge 1515, which is defined by a transition from some fill (the lower leading portion 1502) to more fill (the first stem portion 1504), measured perpendicular to the read direction D. A second substantially linear arrangement 1560 of triangular voids 1570 is positioned substantially parallel to, immediately adjacent and downstream of the last internal detection edge 1530, again relative to the read direction D. The last internal detection edge 1530 is defined by a transition from some fill (the second stem portion 1508) to less fill (the lower trailing portion 1509), measured perpendicular to the read direction D. The first void arrangement 1550 is disposed within the lower leading portion 1502, and the second void arrangement 1560 is disposed within the lower trailing portion 1509.

Figure 16:
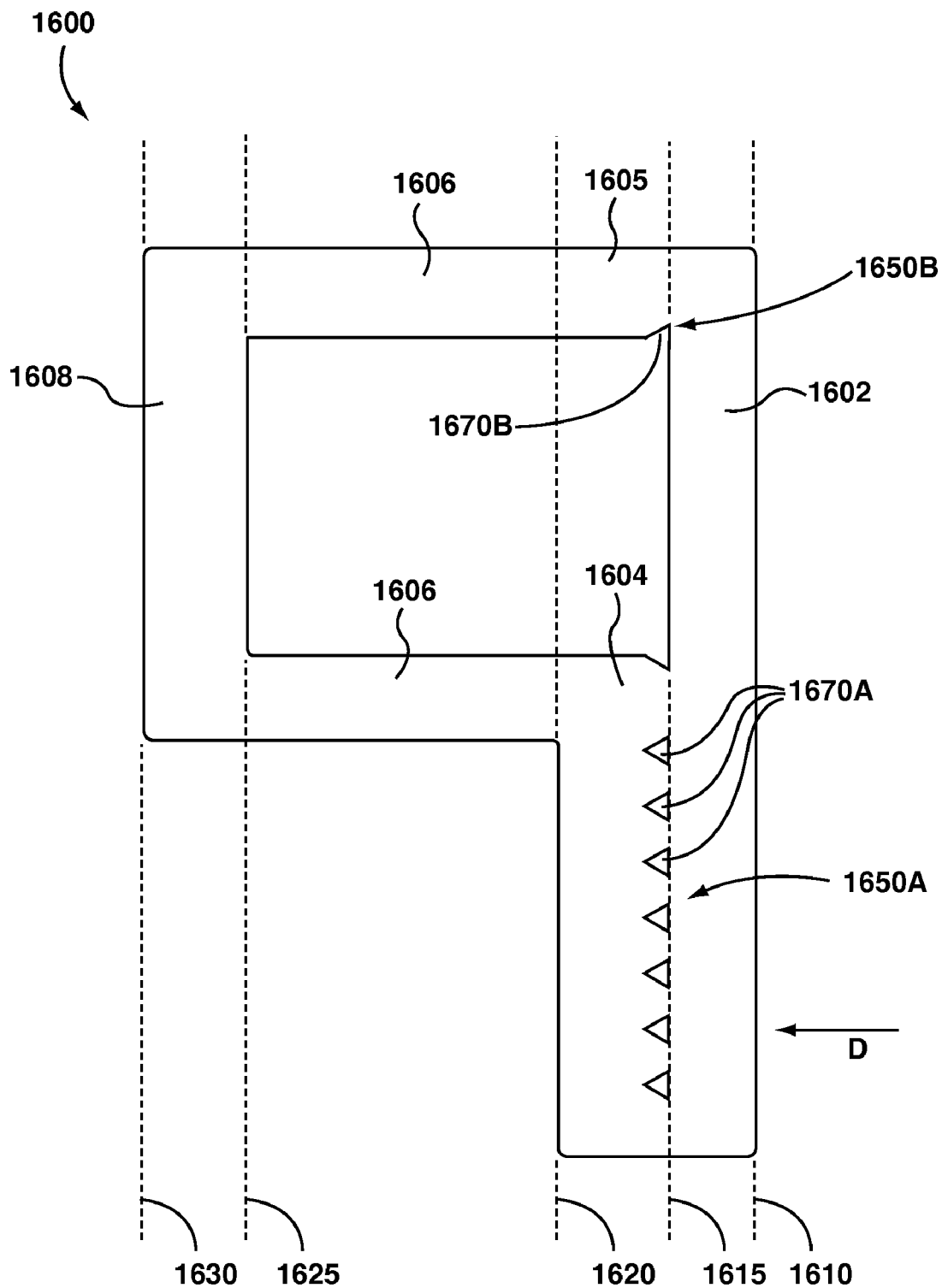
FIG. 16 shows a third exemplary embodiment of a modified character pattern for an E13B "9" character, in accordance with an aspect of the present invention.
Figure 17:
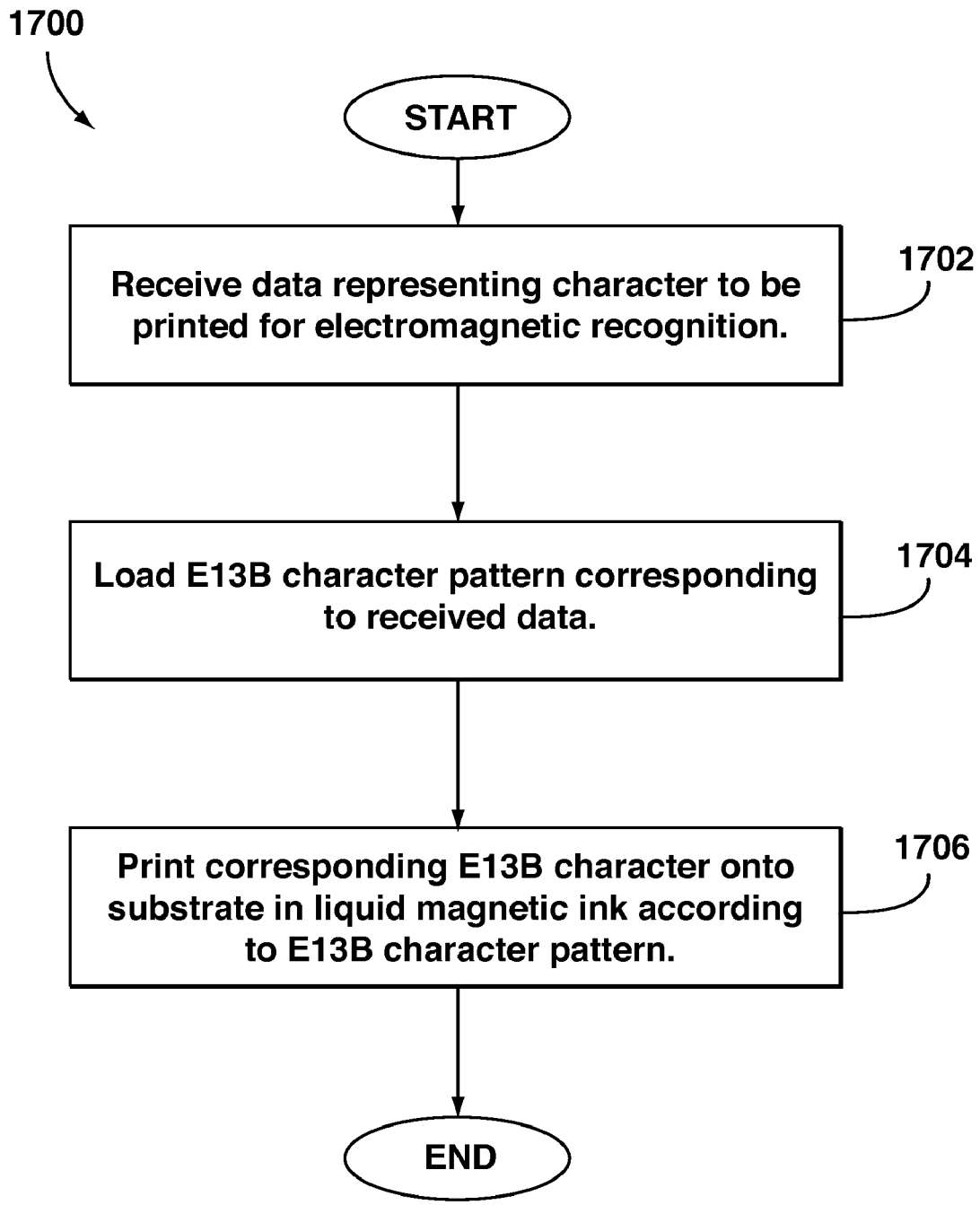
FIG. 17 is a flow chart showing an exemplary method according to an aspect of the present invention.

FIG. 16 shows an exemplary modified character pattern 1600 for an E13B "9", which comprises a leading stem portion 1602, a lower stem continuation portion 1604, an upper stem continuation portion 1605, two horizontally extending members 1606 and a vertical loop completion portion 1608, and defines detection edges 1610, 1615, 1620, 1625, and 1630, analogous to the E13B "9" character patterns shown in FIGS. 11 and 12. A first substantially linear arrangement 1650A of triangular voids 1670A is positioned substantially parallel to, immediately adjacent, and downstream of, relative to the read direction D, the first internal detection edge 1615. A second void arrangement 1650B, comprising a single triangular void 1670B, is also positioned immediately adjacent and downstream, relative to the read direction D, of the first internal detection edge 1615. The first internal detection edge 1615 is defined by a transition from some fill (the leading stem portion 1602) to less fill (the lower stem continuation portion 1604 and upper stem continuation portion 1605), measured perpendicular to the read direction D. The first void arrangement 1650A is disposed within the lower stem continuation portion 1604, and the second void arrangement 1650B is disposed within the upper stem continuation portion 1605. Optionally, the second void arrangement 1650B may comprise a plurality of triangular voids rather than the single triangular void 1670B, or the second void arrangement may be omitted entirely.

As noted above, where conventional inkjet printing and conventional paper are used, particularly at higher speeds, ink will tend to feather from the inked portions into the portions of the printed E13B character corresponding to the location(s) of the void arrangement(s) in the pattern, where no ink was deposited during printing, so that where the individual void(s), and the void arrangement(s) as a whole, are sufficiently small, they will be filled or substantially filled by such ink feathering. When this occurs, the printed E13B character will not contain any voids that are visible to the naked eye, and the region of reduced ink density will be a region which contains ink (which has bled over from adjacent regions) but where the density of the ink, and hence the intensity of the magnetic signal resulting therefrom, is less than that for adjacent regions. Alternatively, where the voids are larger, or where paper with low absorbency is used, there may be portions of the printed E13B character, corresponding to the location of the void arrangement(s) within the patterns, which are not filled or substantially filled by ink feathering. In this case, the region(s) of reduced ink density will include, or in some cases consist of, parts of the E13B character that are substantially free of ink.

By selecting an appropriate size and shape for the void(s), the printed E13B characters can be made fully compliant with the provisions of ANS X9.100-20-2006 governing voids, even in the case of perfect printing and no absorbency such that the voids within the E13B character patterns translate exactly into voids within the printed E13B character.

For example, where three bit by one bit rectangular voids are used in conjunction with a 600 dpi pattern (such as the rectangles 610A shown in FIG. 6A), the vertical length of each such rectangle will be 0.005 inches (approximately 127 micrometers) and the horizontal width of each rectangle will be about 0.0017 inches (approximately 41.6 micrometers). Each such rectangular void 610A will therefore fit entirely within the boundary of a square having sides of 0.008 inches (approximately 203 micrometers) as permitted by ANS X9.100-20-2006. Similarly, where triangular voids (such as the triangles 610B shown in FIG. 6B) are used, they will have a vertical height of 0.005 inches (approximately 127 micrometers) and a horizontal width of about 0.0033 inches (approximately 84.7 micrometers), and therefore the triangular voids will also fit entirely within the boundary of a square having sides of 0.008 inches (approximately 203 micrometers) as permitted by ANS X9.100-20-2006. Similarly, it is preferable that any elongate vertical regions of a printed E13B character that are substantially free of ink (such as would result from perfect printing of the E13B character patterns shown in FIGS. 5, 8, 10 and 12) be no wider than 0.002 inches (approximately 50.8 micrometers) so as to be within the parameters of the E13B standard governing void size. Specifically, ANS X9.100-20-2006 permits such so-called "needle" type voids to be of any length as long as their width does not exceed 0.002 inches (approximately 50.8 micrometers). This is achieved, for 600 dpi E13B character patterns, by elongate vertical voids having a horizontal width of 1 bit or about 0.0017 inches (approximately 41.6 micrometers).

In addition to the above-described dimension limits for individual voids, ANS X9.100-20-2006 also provides that the maximum combined area of all voids within any one vertical column should not exceed 20% of that column, and the above-described void patterns for 600 dpi character patterns are compliant with this requirement.

While it is preferable that the voids be sized and shaped so that the printed E13B characters will be compliant with ANS X9.100-20-2006, it is within the contemplation of the inventors that methods according to aspects of the present invention may be used to print E13B characters having unfilled areas larger than those permitted by ANS X9.100-20-2006, and which may even be visible to the naked eye, so long as the printed character is visually recognizable and is electromagnetically detectable according to the E13B standard waveform.

Moreover, while it is considered preferable for E13B characters printed in accordance with aspects of the present invention to be fully compliant with all relevant standards governing size, shape, relative dimensions as specified in ANS X9.100-20-2006, and other character parameters, it is within the contemplation of the inventors that E13B characters printed according to aspects of the present invention may be noncompliant with one or more relevant E13B standards, so long as the resulting printed character remains both visually recognizable and electromagnetically detectable according to the E13B standard waveform.

One instance of potential noncompliance with an E13B standard relates to the corners of the character patterns. In this regard, it is to be noted that the external corners of the exemplary modified E13B character patterns 400, 500, 700, 800, 900, 1000, 1100, 1200, 1300, 1400, 1500 and 1600 illustrated herein are significantly more angular than the traditional rounded corners provided for in ANS X9.100-20-2006. ANS X9.100-20-2006 provides for the radii at the external corners to be 0.0065 inches (approximately 165 micrometers) other than for the character zero. This departure from ANS X9.100-20-2006 can be seen most clearly be comparing the rounded corners 182 to 199 in the prior art E13B "1" character pattern 100 illustrated in FIG. 1B to the respectively corresponding more angular corners 482 to 499 and 582 to 599 in the modified E13B "1" character patterns 400 illustrated in FIG. 4 and 500 illustrated in FIG. 5. (In the modified E13B "1" character 500 illustrated in FIG. 5, the corners corresponding to the corners 190 and 192 have been obliterated by the presence of the voids 570.) Similar sharpening of the corners of the other modified E13B character patterns 700, 800, 900, 1000, 1100, 1200, 1300, 1400, 1500 and 1600 can be observed by comparing those character patterns to the respective corresponding prior art E13B character patterns shown in FIG. 1A. Typically, in inkjet printing onto conventional paper using liquid magnetic ink, these sharper corners will tend to become more rounded, and hence closer to the curvature specified by ANS X9.100-20-2006, as a result of the absorption of ink into the paper. While sharpening of the corners of the character pattern may result in the radius of curvature of the corners being sharper than provided for in ANS X9.100-20-2006, it has been observed that the aforementioned sharpening of the corners results in improved electromagnetic detectability of the characters. It is within the contemplation of the inventors that E13B character patterns according to aspects of the present invention may have more rounded corners than are illustrated in the exemplary embodiments, and in particular may have corners that are fully compliant with ANS X9.100-20-2006.

Particular exemplary embodiments described herein have included void arrangements that are substantially linear. For example, in the illustrated embodiments, where void arrangements are made up of multiple individual voids, those voids are arranged to form an approximate line running vertically (i.e. parallel to the detection edges). Similarly, void arrangements consisting of a single, elongate rectangle whose long side is parallel to the detection edges have also been shown and described. It is to be appreciated that the present invention is not necessarily limited to substantially linear void arrangements, and may include other types of void arrangements whose void(s) are sized and shaped, and which void arrangements are arranged and positioned relative to a corresponding internal detection edge, to amplify a difference between the upstream magnetic signal and the downstream magnetic signal when an electromagnetic read head reads the resulting printed E13B character.

While rectangular and triangular voids have been discussed and illustrated as particular examples, the present invention is not intended to be limited to voids having those shapes. In addition, it is within the contemplation of the inventors that there may be suitable embodiments in which combinations of shapes may be used, such as a combination of rectangles and triangles, for example. Any void arrangement, and any particular shape(s) of voids may be used, without departing from the scope of the present invention so long as the resulting printed character is visually recognizable and is electromagnetically detectable according to the E13B standard waveform.

Aspects of the present invention may be implemented on any suitable computer or microprocessor-based system coupled to a printer. An exemplary computer system in respect of which aspects of the present invention may be implemented, is presented as a block diagram in FIG. 18. The exemplary computer system is denoted generally by reference numeral 1800 and includes a display 1802, input devices in the form of keyboard 1804A and pointing device 1804B, computer 1806 and external devices 1808. While pointing device 1804B is depicted as a mouse, it will be appreciated that other types of pointing device may also be used.

Figure 18:
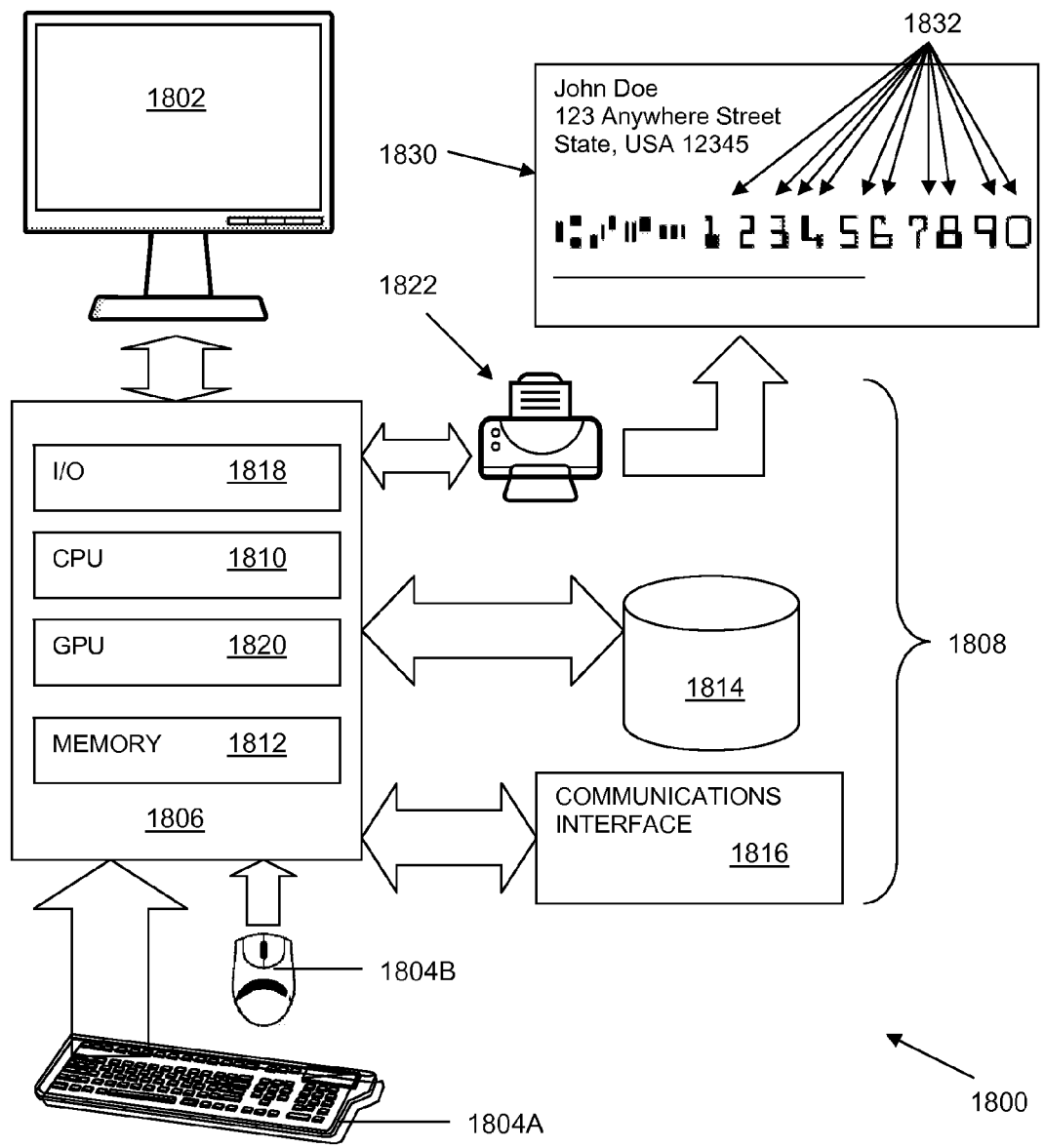
FIG. 18 is a block diagram showing an exemplary computer system in respect of which aspects of the present invention may be implemented.

The computer 1806 may contain one or more processors or microprocessors, such as a central processing unit (CPU) 1810. The CPU 1810 performs arithmetic calculations and control functions to execute software stored in an internal memory 1812, preferably random access memory (RAM) and/or read only memory (ROM), and possibly additional memory 1814. Typically, the CPU 1810 (which may include one or more processors) is coupled directly or indirectly to memory elements through a system bus. The memory elements can include the internal memory 1812, which is employed during actual execution of the program code. The additional memory 1814 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, or similar storage media as known in the art. This additional memory 1814 may be physically internal to the computer 1806, or external as shown in FIG. 18. The computer system 1800 may also include other similar means for allowing computer programs or other instructions to be loaded. Such means can include, for example, a communications interface 1816 which allows software and data to be transferred between the computer system 1800 and external systems and networks. Examples of communications interface 1816 can include a modem, a network interface such as an Ethernet card, a wireless communication interface, or a serial or parallel communications port. Software and data transferred via communications interface 1816 are in the form of signals which can be electronic, electromagnetic, optical or other signals capable of being received by communications interface 1816. Multiple interfaces, of course, can be provided on a single computer system 1800.

Input and output to and from the computer 1806 is administered by the input/output (I/O) interface 1818. This I/O interface 1818 administers control of the display 1802, keyboard 1804A and pointing device 1804B, external devices 1808 and other such components of the computer system 1800. The computer 1806 also includes a graphical processing unit (GPU) 1820.

The computer 1806 is coupled to a printer 1822, which may be, for example, an inkjet printer. The computer 1806 may be coupled to the printer 1822 directly, or indirectly via a network. As such, the computer can transmit instructions to the printer 1822 to cause the printer 1822 to execute printing operations. When coupled to a printer 1822 according to an aspect of the present invention, the computer 1806 may be a personal computer such as a desktop or a laptop, or may be a server computer. In alternate embodiments, such as a printer system including its own processing, memory and storage, the computer 1806 may be the processing, memory and storage system within the printer system, and the printing hardware is the printer 1822.

A computer 1806 coupled to a printer 1822 may be used to generate a substrate 1830 having printed thereon in magnetic ink at least one electromagnetically recognizable E13B character 1832 having an interior that is substantially completely inked and having a shape that defines a plurality of internal detection edges. As described and illustrated herein, the interior of the E13B character 1832 includes at least one region of reduced ink density arranged and positioned relative to a corresponding internal detection edge to amplify a difference between an upstream magnetic signal detected on an upstream side of the corresponding internal detection edge and a downstream magnetic signal detected on a downstream side of the corresponding internal detection edge when an electromagnetic read head reads the at least one printed E13B character. In a particular embodiment, the interior of the E13B character 1832 includes at least one elongate, narrow region of reduced ink density immediately adjacent at least one respective internal detection edge to augment that at least one detection edge. The substrate 1830 may be, for example, a check.

Embodiments of aspects of the present invention may be implemented entirely in hardware embodiment, entirely in software, or by way of a combination of hardware and software. In a preferred embodiment, the invention is implemented in software, which includes but is not limited to firmware, resident software, microcode, and the like. Furthermore, the invention can take the form of a computer program product accessible from a computer usable or computer readable medium providing program code for use by or in connection with a computer or any instruction execution system. In such embodiments, the computer program product may reside on a computer usable or computer readable medium in a computer such as the computer 1806, on a computer usable or computer readable medium on a printer such as the printer 1822, on a computer usable or computer readable medium external to both the printer or the computer, or on any combination thereof.

It is to be understood that the terms "computer usable medium" and "computer readable medium" are intended to encompass any apparatus that can contain, store, communicate, transport the program for use by or in connection with the instruction execution system, apparatus, or device. For example, and without limitation, the medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and DVD read/write (DVD-R/W).

While aspects of the present invention are considered advantageous for use in inkjet printing of MICR characters, and particularly for inkjet printing using aqueous magnetic ink, it is within the contemplation of the inventors that aspects of the present invention may be used to increase edge acuity with other types of printing. For example, aspects of the present invention could, with suitable modification, be applied to laser printing of MICR characters.

One or more currently preferred embodiments have been described by way of example. It will be apparent to persons skilled in the art that a number of variations and modifications can be made without departing from the scope of the invention as defined in the claims.

What is claimed is:

1. A substrate having printed thereon in magnetic ink at least one electromagnetically recognizable E13B character selected from the group consisting of "1", "3", "8" and "9", each such E13B character having an interior that is substantially completely inked and having a shape that defines a plurality of internal detection edges, wherein the interior of each such E13B character includes at least one elongate, narrow region of reduced ink density immediately adjacent at least one respective internal detection edge to augment that at least one detection edge.

2. The substrate of claim 1, wherein the interior of one of the at least one E13B character includes an elongate, narrow region of reduced ink density immediately adjacent and downstream, relative to a read direction, of a detection edge defined by a transition from some magnetic ink to less magnetic ink.

3. The substrate of claim 1, wherein the interior of one of the at least one E13B character includes an elongate, narrow region of reduced ink density immediately adjacent and upstream, relative to a read direction, of a detection edge defined by a transition from some magnetic ink to more magnetic ink.

4. The substrate of claim 1, wherein each E13B character is compliant with ANSI specification X9.100-20-2006.

5. The substrate of claim 1, wherein the at least one E13B character comprises at least one "1", and wherein the interior of each "1" includes at least one elongate, narrow region of reduced ink density immediately adjacent and downstream of, relative to a read direction, a last internal detection edge defined by a transition from some magnetic ink to less magnetic ink.

6. The substrate of claim 5, wherein each "1" comprises a leading base portion, a stem portion, a serif portion and a trailing base portion, wherein the last internal detection edge defined by a transition from some magnetic ink to less magnetic ink is defined by a transition between the stem portion and the serif and trailing base portions, and wherein the at least one elongate, narrow region of reduced ink density comprises a first elongate, narrow region of reduced ink density disposed substantially within the trailing base portion and a second elongate, narrow region of reduced ink density disposed substantially within the serif portion.

7. The substrate of claim 1, wherein the at least one E13B character comprises at least one "3", and wherein the interior of each "3" includes an elongate, narrow region of reduced ink density immediately adjacent and upstream of, relative to a read direction, a first internal detection edge defined by a transition from some magnetic ink to more magnetic ink.

8. The substrate of claim 7, wherein each "3" comprises a lower leading portion, a stem portion, and three horizontally extending members, wherein the first internal detection edge defined by a transition from some magnetic ink to more magnetic ink is defined between the lower leading portion and the stem portion, and wherein an elongate, narrow region of reduced ink density is disposed substantially within the lower leading portion.

9. The substrate of claim 1, wherein the at least one E13B character comprises at least one "8", and wherein the interior of each "8" includes a first elongate, narrow region of reduced ink density immediately adjacent and upstream of, relative to a read direction, a first internal detection edge defined by a transition from some magnetic ink to more magnetic ink, and a second elongate, narrow region of reduced ink density immediately adjacent and downstream of, relative to the read direction, a last internal detection edge defined by a transition from some magnetic ink to less magnetic ink.

10. The substrate of claim 9, wherein each "8" comprises a lower leading portion, a first stem portion, three horizontally extending members, a second stem portion, and a lower trailing portion, wherein:
   the first internal detection edge defined by a transition from some magnetic ink to more magnetic ink is defined between the lower leading portion and the first stem portion, and wherein the first elongate, narrow region of reduced ink density is disposed substantially within the lower leading portion; and
   the last internal detection edge defined by a transition from some magnetic ink to less magnetic ink is defined between the second stem portion and the lower trailing portion, and wherein the second elongate, narrow region of reduced ink density is disposed substantially within the lower trailing portion.

11. The substrate of claim 1, wherein the at least one E13B character comprises at least one "9", and wherein the interior of each "9" includes an elongate, narrow region of reduced ink density immediately adjacent and downstream of, relative to a read direction, a first internal detection edge defined by a transition from some magnetic ink to less magnetic ink.

12. The substrate of claim 11, wherein each "9" comprises a leading stem portion, a lower stem continuation portion, an upper stem continuation portion, two horizontally extending members and a vertical loop completion portion, and wherein the first internal detection edge defined by a transition from some magnetic ink to less magnetic ink is defined between the leading stem portion and the lower and upper stem continuation portions, and wherein an elongate, narrow region of reduced ink density is disposed substantially within the lower stem continuation portion.

13. A method for inkjet printing an electromagnetically recognizable E13B character onto a substrate using liquid magnetic ink, comprising:
   receiving data representing a character to be printed for electromagnetic recognition, the character selected from the group consisting of "1", "3", "8" and "9";
   loading an E13B character pattern corresponding to the received data, the E13B character pattern:
      being substantially completely filled;
      defining a plurality of internal detection edges for a corresponding E13B character; and
      defining at least one substantially linear void arrangement immediately adjacent and parallel to at least one of the internal detection edges; and
   printing the corresponding E13B character onto the substrate in liquid magnetic ink according to the E13B character pattern;
   whereby the printing of the corresponding E13B character produces an E13B character that is electromagnetically recognizable and includes at least one elongate, narrow region of reduced ink density corresponding to the at least one substantially linear void arrangement to augment the respective at least one internal detection edge.

14. The method of claim 13, wherein the printing step further comprises substantially filling each void arrangement by ink feathering to produce the at least one region of reduced ink density.

15. The method of claim 13, wherein the step of loading the E13B character pattern corresponding to the received data comprises loading the E13B character pattern having at least one substantially linear void arrangement comprising at least one plurality of voids arranged in a narrow, elongate, substantially linear formation.

16. The method of claim 13, wherein the step of loading the E13B character pattern corresponding to the received data comprises loading the E13B character pattern having at least one substantially linear void arrangement comprising at least one narrow, elongate individual void.

17. The method of claim 13, wherein the step of loading the E13B character pattern corresponding to the received data comprises loading the E13B character pattern having at least one substantially linear void arrangement located downstream, relative to a read direction, of a detection edge defined by a transition from some fill to less fill, measured perpendicular to the read direction.

18. The method of claim 13, wherein the step of loading the E13B character pattern corresponding to the received data comprises loading the E13B character pattern having at least one substantially linear void arrangement located upstream, relative to a read direction, of a detection edge defined by a transition from some fill to more fill, measured perpendicular to the read direction.

19. The method of claim 13, wherein the step of loading the E13B character pattern corresponding to the received data comprises loading the E13B character pattern having at least one substantially linear void arrangement comprising a rectangular void having long sides and short sides, in which each rectangular void is arranged so that its long sides are parallel to the respective at least one internal detection edge.

20. The method of claim 19, wherein the step of loading the E13B character pattern corresponding to the received data comprises loading a 600 dpi bitmap E13B character pattern in which each substantially linear void arrangement comprises a plurality of individual rectangular voids, and in which each rectangular void comprises a three bit by one bit rectangle, and in which each rectangle in each substantially linear void arrangement is vertically separated by one filled bit.

21. The method of claim 13, wherein the printing step comprises printing the corresponding E13B character that is compliant with ANSI specification X9.100-20-2006.

22. The method of claim 13, wherein the character is a "1", and wherein the step of loading the E13B character pattern corresponding to the received data comprises loading the E13B character pattern for the "1" which includes at least one substantially linear void arrangement that is substantially parallel to, immediately adjacent, and downstream of, relative to a read direction, a last internal detection edge defined by a transition from some fill to less fill, measured perpendicular to the read direction.

23. The method of claim 22, wherein the step of loading the E13B character pattern corresponding to the received data further comprises loading the E13B character pattern for the "1" comprising a leading base portion, a stem portion, a serif portion and a trailing base portion, in which the last internal detection edge defined by a transition from some fill to less fill is defined by a transition between the stem portion and the serif and trailing base portions, and which includes a first substantially linear void arrangement within the trailing base portion and a second substantially linear void arrangement within the serif portion.

24. The method of claim 13, wherein the character is a "3", and wherein the step of loading the E13B character pattern corresponding to the received data comprises loading the E13B character pattern for the "3" which includes a substantially linear void arrangement that is substantially parallel to, immediately adjacent, and upstream of, relative to a read direction, a first internal detection edge defined by a transition from some fill to more fill, measured perpendicular to the read direction.

25. The method of claim 24, wherein the step of loading the E13B character pattern corresponding to the received data further comprises loading the E13B character pattern for the "3" comprising a lower leading portion, a stem portion, and three horizontally extending members, in which the first internal detection edge defined by a transition from some fill to more fill is defined between the lower leading portion and the stem portion, and which includes a substantially linear void arrangement within the lower leading portion.

26. The method of claim 13, wherein the character is an "8", and wherein the step of loading the E13B character pattern corresponding to the received data comprises loading the E13B character pattern for the "8" which includes a first substantially linear void arrangement that is substantially parallel to, immediately adjacent and upstream of, relative to a read direction, a first internal detection edge defined by a transition from some fill to more fill, measured perpendicular to the read direction, and a second substantially linear void arrangement that is substantially parallel to, immediately adjacent and downstream of, relative to the read direction, a last internal detection edge defined by a transition from some fill to less fill, measured perpendicular to the read direction.

27. The method of claim 26, wherein the step of loading the E13B character pattern corresponding to the received data further comprises loading the E13B character pattern for the "8" comprising a lower leading portion, a first stem portion, three horizontally extending members, a second stem portion, and a lower trailing portion, in which:
the first internal detection edge defined by a transition from some fill to more fill is defined between the lower leading portion and the first stem portion, and the first substantially linear void arrangement is within the lower leading portion; and
the last internal detection edge defined by a transition from some fill to less fill is defined between the second stem portion and the lower trailing portion, and the second substantially linear void arrangement is within the lower trailing portion.

28. The method of claim 13, wherein the character is a "9", and wherein the step of loading the E13B character pattern corresponding to the received data comprises loading the E13B character pattern for the "9" which includes a substantially linear void arrangement that is substantially parallel to, immediately adjacent, and downstream of, relative to a read direction, a first internal detection edge defined by a transition from some fill to less fill, measured perpendicular to the read direction.

29. The method of claim 28, wherein the step of loading the E13B character pattern corresponding to the received data further comprises loading the E13B character pattern for the "9" comprising a leading stem portion, a lower stem continuation portion, an upper stem continuation portion, two horizontally extending members and a vertical loop completion portion, in which the first internal detection edge defined by a transition from some fill to less fill is defined between the leading stem portion and the lower and upper stem continuation portions, and in which a substantially linear void arrangement is disposed within the lower stem continuation portion.

30. A method for inkjet printing an electromagnetically recognizable numerical E13B character onto a substrate using liquid magnetic ink, comprising:
receiving data representing a character to be printed for electromagnetic recognition;
loading an E13B character pattern corresponding to the received data, the E13B character pattern:
being substantially completely filled;
defining a plurality of internal detection edges for a corresponding E13B character; and
defining at least one void arrangement sized and shaped, and arranged and positioned relative to a corresponding internal detection edge, to amplify a difference between an upstream magnetic signal on an upstream side of the corresponding internal detection edge and a downstream magnetic signal detected on a downstream side of the corresponding internal detection edge;
printing an electromagnetically recognizable corresponding E13B character onto the substrate in liquid magnetic ink according to the E13B character pattern to produce the corresponding E13B character having at least one region of reduced ink density corresponding to the at least one void arrangement.

31. The method of claim 30, wherein the character is selected from the group consisting of "1", "3", "8" and "9".

32. The method of claim 31, wherein the printing step further comprises printing each corresponding E13B character to be compliant with ANSI specification X9.100-20-2006.

33. A substrate having printed thereon in magnetic ink at least one electromagnetically recognizable numerical E13B character, each such E13B character having an interior that is substantially completely inked and having a shape that defines a plurality of internal detection edges, wherein the interior of each such E13B character includes at least one region of reduced ink density arranged and positioned relative to a corresponding internal detection edge to amplify a difference between an upstream magnetic signal detected on an upstream side of the corresponding internal detection edge and a downstream magnetic signal detected on a downstream side of the corresponding internal detection edge when an electromagnetic read head reads the at least one printed E13B character.

34. The substrate of claim 33, wherein the character is selected from the group consisting of "1", "3", "8" and "9".

35. The substrate of claim 33, wherein each E13B character is compliant with ANSI specification X9.100-20-2006.

36. A computer program product comprising a computer usable medium having computer usable program code for inkjet printing an electromagnetically recognizable E13B character onto a substrate using liquid magnetic ink, said computer program product including:
computer usable program code for receiving data representing a character to be printed for electromagnetic recognition, the character selected from the group consisting of "1", "3", "8" and "9";
computer usable program code for loading an E13B character pattern corresponding to the received data, the E13B character pattern:
being substantially completely filled;
defining a plurality of internal detection edges for a corresponding E13B character; and
defining at least one substantially linear void arrangement immediately adjacent and parallel to at least one of the internal detection edges; and
computer usable program code for printing the corresponding E13B character onto the substrate in liquid magnetic ink according to the E13B character pattern to produce an E13B character that is electromagnetically recognizable and includes at least one elongate, narrow region of reduced ink density corresponding to the at least one substantially linear void arrangement to augment the respective at least one internal detection edge.

37. The computer program product of claim 36, wherein the computer usable program code for loading the E13B character pattern corresponding to the received data further comprises the E13B character pattern, the E13B character pattern having at least one substantially linear void arrangement comprising at least one plurality of voids arranged in a narrow, elongate, substantially linear formation.

38. The computer program product of claim 36, wherein the computer usable program code for loading the E13B character pattern further comprises the E13B character pattern, the E13B character pattern having at least one substantially linear void arrangement comprising at least one narrow, elongate individual void.

39. The computer program product of claim 36, wherein the computer usable program code for loading the E13B character pattern further comprises the E13B character pattern, the E13B character pattern having at least one substantially linear void arrangement located downstream, relative to a read direction, of a detection edge defined by a transition from some fill to less fill, measured perpendicular to the read direction.

40. The computer program product of claim 36, wherein the computer usable program code for loading the E13B character pattern further comprises the E13B character pattern, the E13B character pattern having at least one substantially linear void arrangement located upstream, relative to a read direction, of a detection edge defined by a transition from some fill to more fill, measured perpendicular to the read direction.

41. The computer program product of claim 36, wherein the computer usable program code for loading the E13B character pattern further comprises the E13B character pattern, the E13B character pattern having at least one substantially linear void arrangement comprising a rectangular void having long sides and short sides, in which each rectangular void is arranged so that its long sides are parallel to the respective at least one internal detection edge.

42. The computer program product of claim 41, wherein the E13B character pattern is a 600 dpi bitmap E13B character pattern in which each substantially linear void arrangement comprises a plurality of individual rectangular voids, and in which each rectangular void comprises a three bit by one bit rectangle, and in which each rectangle in each substantially linear void arrangement is vertically separated by one filled bit.

43. The computer program product of claim 36, wherein the computer usable program code for printing the electromagnetically recognizable corresponding E13B character onto the substrate comprises computer usable program code for printing the corresponding E13B character to be compliant with ANSI specification X9.100-20-2006.

44. The computer program product of claim 36, wherein the character is a "1", and wherein the computer usable program code for loading the E13B character pattern corresponding to the received data further comprises the E13B character pattern for the "1", the E13B character pattern for the 1 including at least one substantially linear void arrangement that is substantially parallel to, immediately adjacent, and downstream of, relative to a read direction, a last internal detection edge defined by a transition from some fill to less fill, measured perpendicular to the read direction.

45. The computer program product of claim 44, wherein the E13B character pattern for the "1" comprises a leading base portion, a stem portion, a serif portion and a trailing base portion, in which the last internal detection edge defined by a transition from some fill to less fill is defined by a transition between the stem portion and the serif and trailing base portions, and which includes a first substantially linear void arrangement within the trailing base portion and a second substantially linear void arrangement within the serif portion.

46. The computer program product of claim 36, wherein the character is a "3", and wherein the computer usable program code for loading the E13B character pattern corresponding to the received data further comprises the E13B character pattern for the "3", the E13B character pattern for the "3" including a substantially linear void arrangement that is substantially parallel to, immediately adjacent, and upstream of, relative to a read direction, a first internal detection edge defined by a transition from some fill to more fill, measured perpendicular to the read direction.

47. The computer program product of claim 46, wherein the E13B character pattern for the "3" comprises a lower leading portion, a stem portion, and three horizontally extending members, in which the first internal detection edge defined by a transition from some fill to more fill is defined between the lower leading portion and the stem portion, and which includes a substantially linear void arrangement within the lower leading portion.

48. The computer program product of claim 36, wherein the character is an "8", and wherein the computer usable program code for loading the E13B character pattern corresponding to the received data further comprises the E13B character pattern for the "8", the E13B character pattern for the "8" including a first substantially linear void arrangement that is substantially parallel to, immediately adjacent and upstream of, relative to a read direction, a first internal detection edge defined by a transition from some fill to more fill, measured perpendicular to the read direction, and a second substantially linear void arrangement that is substantially parallel to, immediately adjacent and downstream of, relative to the read direction, a last internal detection edge defined by a transition from some fill to less fill, measured perpendicular to the read direction.

49. The computer program product of claim 48, wherein the E13B character pattern for the "8" comprises a lower leading portion, a first stem portion, three horizontally extending members, a second stem portion, and a lower trailing portion, in which:
  the first internal detection edge defined by a transition from some fill to more fill is defined between the lower leading portion and the first stem portion, and the first substantially linear void arrangement is within the lower leading portion; and
  the last internal detection edge defined by a transition from some fill to less fill is defined between the second stem portion and the lower trailing portion, and the second substantially linear void arrangement is within the lower trailing portion.

50. The computer program product of claim 36, wherein the character is a "9", and wherein the computer usable program code for loading the E13B character pattern corresponding to the received data further comprises the E13B character pattern for the "9", the E13B character pattern for the "9" including a substantially linear void arrangement that is substantially parallel to, immediately adjacent, and downstream of, relative to a read direction, a first internal detection edge defined by a transition from some fill to less fill, measured perpendicular to the read direction.

51. The computer program product of claim 50, wherein the E13B character pattern for the "9" comprises a leading stem portion, a lower stem continuation portion, an upper stem continuation portion, two horizontally extending members and a vertical loop completion portion, in which the first internal detection edge defined by a transition from some fill to less fill is defined between the leading stem portion and the lower and upper stem continuation portions, and in which a substantially linear void arrangement is disposed within the lower stem continuation portion.

52. A computer program product comprising a computer usable medium having computer usable program code for inkjet printing an electromagnetically recognizable numerical E13B character onto a substrate using liquid magnetic ink, said computer program product including:
    computer usable program code for receiving data representing a character to be printed for electromagnetic recognition;
    computer usable program code for loading an E13B character pattern corresponding to the received data, the E13B character pattern:
        being substantially completely filled;
        defining a plurality of internal detection edges for a corresponding E13B character; and
        defining at least one void arrangement sized and shaped, and arranged and positioned relative to a corresponding internal detection edge, to amplify a difference between an upstream magnetic signal on an upstream side of the corresponding internal detection edge and a downstream magnetic signal detected on a downstream side of the corresponding internal detection edge; and
    computer usable program code for printing an electromagnetically recognizable corresponding E13B character onto the substrate in liquid magnetic ink according to the E13B character pattern to produce the corresponding E13B character having at least one region of reduced ink density corresponding to the at least one void arrangement.

53. The computer program product of claim 52, wherein the character is selected from the group consisting of "1", "3", "8" and "9".

54. The computer program product of claim 53, wherein the computer usable program code for printing an electromagnetically recognizable corresponding E13B character onto the substrate in liquid magnetic ink further comprises computer usable program code for printing each corresponding E13B character to be compliant with ANSI specification X9.100-20-2006.

55. A system for inkjet printing an electromagnetically recognizable numerical E13B character onto a substrate using liquid magnetic ink, comprising:
    a memory for storing instructions;
    an inkjet printer; and
    a processing unit coupled to the printer for driving the printer and coupled to the memory for executing the instructions stored in the memory;
    wherein the instructions, when executed by the processing unit, cause the system to:
    receive data representing a character to be printed for electromagnetic recognition, the character selected from the group consisting of "1", "3", "8" and "9";
    load an E13B character pattern corresponding to the received data, the E13B character pattern:
        being substantially completely filled;
        defining a plurality of internal detection edges for a corresponding E13B character; and
        defining at least one substantially linear void arrangement immediately adjacent and parallel to at least one of the internal detection edges; and
    use the printer to print the corresponding E13B character onto the substrate in liquid magnetic ink according to the E13B character pattern;
    whereby the printing of the corresponding E13B character produces an E13B character that is electromagnetically recognizable and includes at least one elongate, narrow region of reduced ink density corresponding to the at least one substantially linear void arrangement to augment the respective at least one internal detection edge.

56. The system of claim 55, wherein the loaded E13B character pattern has at least one substantially linear void arrangement comprising at least one plurality of voids arranged in a narrow, elongate, substantially linear formation.

57. The system of claim 55, wherein the loaded E13B character pattern has at least one substantially linear void arrangement comprising at least one narrow, elongate individual void.

58. The system of claim 55, wherein the loaded E13B character pattern has at least one substantially linear void arrangement located downstream, relative to a read direction, of a detection edge defined by a transition from some fill to less fill, measured perpendicular to the read direction.

59. The system of claim 55, wherein the loaded E13B character pattern has at least one substantially linear void arrangement located upstream, relative to a read direction, of a detection edge defined by a transition from some fill to more fill, measured perpendicular to the read direction.

60. The system of claim 55, wherein the loaded E13B character pattern has at least one substantially linear void arrangement comprising a rectangular void having long sides and short sides, in which each rectangular void is arranged so that its long sides are parallel to the respective at least one internal detection edge.

61. The system of claim 60, wherein the loaded E13B character pattern comprises a 600 dpi bitmap E13B character pattern in which each substantially linear void arrangement comprises a plurality of individual rectangular voids, and in which each rectangular void comprises a three bit by one bit rectangle, and in which each rectangle in each substantially linear void arrangement is vertically separated by one filled bit.

62. The system of claim 55, wherein the printer prints the corresponding E13B character to be compliant with ANSI specification X9.100-20-2006.

63. The system of claim 55, wherein the character is a "1", and wherein the loaded E13B character pattern for the "1" includes at least one substantially linear void arrangement that is substantially parallel to, immediately adjacent, and downstream of, relative to a read direction, a last internal detection edge defined by a transition from some fill to less fill, measured perpendicular to the read direction.

64. The system of claim 63, wherein the loaded E13B character pattern for the "1" comprises a leading base portion, a stem portion, a serif portion and a trailing base portion, in which the last internal detection edge defined by a transition from some fill to less fill is defined by a transition between the stem portion and the serif and trailing base portions, and which includes a first substantially linear void arrangement within the trailing base portion and a second substantially linear void arrangement within the serif portion.

65. The system of claim 55, wherein the character is a "3", and wherein the loaded E13B character pattern for the "3" includes a substantially linear void arrangement that is substantially parallel to, immediately adjacent, and upstream of, relative to a read direction, a first internal detection edge defined by a transition from some fill to more fill, measured perpendicular to the read direction.

66. The system of claim 65, wherein the loaded E13B character pattern for the "3" comprises a lower leading portion, a stem portion, and three horizontally extending members, in which the first internal detection edge defined by a transition from some fill to more fill is defined between the lower leading portion and the stem portion, and which includes a substantially linear void arrangement within the lower leading portion.

67. The system of claim 55, wherein the character is an "8", and wherein the loaded E13B character pattern for the "8" includes a first substantially linear void arrangement that is substantially parallel to, immediately adjacent and upstream of, relative to a read direction, a first internal detection edge defined by a transition from some fill to more fill, measured perpendicular to the read direction, and a second substantially linear void arrangement that is substantially parallel to, immediately adjacent and downstream of, relative to the read direction, a last internal detection edge defined by a transition from some fill to less fill, measured perpendicular to the read direction.

68. The system of claim 67, wherein the loaded the E13B character pattern for the "8" comprises a lower leading portion, a first stem portion, three horizontally extending members, a second stem portion, and a lower trailing portion, in which:
the first internal detection edge defined by a transition from some fill to more fill is defined between the lower leading portion and the first stem portion, and the first substantially linear void arrangement is within the lower leading portion; and
the last internal detection edge defined by a transition from some fill to less fill is defined between the second stem portion and the lower trailing portion, and the second substantially linear void arrangement is within the lower trailing portion.

69. The system of claim 55, wherein the character is a "9", and wherein the loaded E13B character pattern for the "9" includes a substantially linear void arrangement that is substantially parallel to, immediately adjacent, and downstream of, relative to a read direction, a first internal detection edge defined by a transition from some fill to less fill, measured perpendicular to the read direction.

70. The system of claim 69, wherein the loaded E13B character pattern for the "9" comprises a leading stem portion, a lower stem continuation portion, an upper stem continuation portion, two horizontally extending members and a vertical loop completion portion, in which the first internal detection edge defined by a transition from some fill to less fill is defined between the leading stem portion and the lower and upper stem continuation portions, and in which a substantially linear void arrangement is disposed within the lower stem continuation portion.

71. A system for inkjet printing an electromagnetically recognizable numerical E13B character onto a substrate using liquid magnetic ink, comprising:
a memory for storing instructions;
an inkjet printer; and
a processing unit coupled to the printer for driving the printer and coupled to the memory for executing the instructions stored in the memory;
wherein the instructions, when executed by the processing unit, cause the system to:
receive data representing a character to be printed for electromagnetic recognition;
load an E13B character pattern corresponding to the received data, the E13B character pattern:
being substantially completely filled;
defining a plurality of internal detection edges for a corresponding E13B character; and
defining at least one void arrangement sized and shaped, and arranged and positioned relative to a corresponding internal detection edge, to amplify a difference between an upstream magnetic signal on an upstream side of the corresponding internal detection edge and a downstream magnetic signal detected on a downstream side of the corresponding internal detection edge;
use the printer to print an electromagnetically recognizable corresponding E13B character onto the substrate in liquid magnetic ink according to the E13B character pattern to produce the corresponding E13B character having at least one region of reduced ink density corresponding to the at least one void arrangement.

72. The system of claim 71, wherein the character is selected from the group consisting of "1", "3", "8" and "9".

73. The system of claim 72, wherein the printer prints each corresponding E13B character to be compliant with ANSI specification X9.100-20-2006.

* * * * *